United States Patent
Kishiyama et al.

(10) Patent No.: US 8,130,715 B2
(45) Date of Patent: Mar. 6, 2012

(54) BASE STATION AND METHOD OF GENERATING A SYNCHRONIZATION CHANNEL

(75) Inventors: Yoshihisa Kishiyama, Yokosuka (JP); Satoshi Nagata, Yokosuka (JP); Motohiro Tanno, Yokohama (JP); Kenichi Higuchi, Yokohama (JP); Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 700 days.

(21) Appl. No.: 12/299,083

(22) PCT Filed: Apr. 20, 2007

(86) PCT No.: PCT/JP2007/058596
§ 371 (c)(1), (2), (4) Date: Feb. 6, 2009

(87) PCT Pub. No.: WO2007/129546
PCT Pub. Date: Nov. 15, 2007

(65) Prior Publication Data
US 2009/0238137 A1 Sep. 24, 2009

(30) Foreign Application Priority Data

May 1, 2006 (JP) ................ 2006-127993
Jun. 19, 2006 (JP) ................ 2006-169452
Aug. 22, 2006 (JP) ................ 2006-225922

(51) Int. Cl.
*H04W 4/00* (2009.01)
(52) U.S. Cl. .................. 370/330; 370/329
(58) Field of Classification Search ............ 370/329, 370/330
See application file for complete search history.

(56) References Cited

U.S. PATENT DOCUMENTS 7,916,759 B2 * 3/2011 Han et al. ............ 370/512

FOREIGN PATENT DOCUMENTS

| EP | 1 892 865 A1 | 2/2008 |
| EP | 1 906 571 A1 | 4/2008 |
| JP | 2003-179522 A | 6/2003 |
| JP | 2006-074493 A | 3/2006 |
| JP | 2007-089113 | 4/2007 |
| WO | 2006/134829 A1 | 12/2006 |
| WO | 2006/134949 A1 | 12/2006 |
| WO | 2007/020710 A1 | 2/2007 |

(Continued)

OTHER PUBLICATIONS

NTT DoCoMo, "Physical Channels and Multiplexing in Evolved UTRA Downlink," 3GPP TSG RAN WG1 Ad Hoc on LTE, Jun. 21, 2005, R1-050590, 23 pages.

(Continued)

*Primary Examiner* — Kenny Lin
(74) *Attorney, Agent, or Firm* — Osha • Liang LLP

(57) ABSTRACT

A synchronization channel is generated by generating, as a P-SCH basic waveform, a signal sequence in which codes with constant amplitude in a frequency domain are placed at intervals of a predetermined number of subcarriers; transforming the signal sequence into a time domain; multiplying the signal sequence transformed into the time domain with a predetermined code sequence; retransforming the signal sequence multiplied with the predetermined code sequence into the frequency domain; generating an S-SCH signal sequence; and multiplexing the signal sequence retransformed into the frequency domain and the S-SCH signal sequence.

15 Claims, 27 Drawing Sheets

FOREIGN PATENT DOCUMENTS

WO 2007/023578 A1 3/2007

OTHER PUBLICATIONS

NTT DoCoMo, Fujitsu, Mitsubishi Electric, NEC, "Cell Search Time Performance of Three-Step Cell Search Method," 3GPP TSG-RAN WG1 Meeting #44bis, Mar. 31, 2006, R1-060781, 9 pages.

Written Opinion issued in PCT/JP2007/058596, mailed on Jul. 24, 2007, 3 pages.

International Search Report issued in PCT/JP2007/058596, mailed on Jul. 24, 2007, with translation, 5 pages.

Tachikawa, Keiji, "W-CDMA Mobile Communication System", published by Maruzen K.K., Japan, Mar. 15, 2002, p. 112, with English translation (3 pages).

* cited by examiner

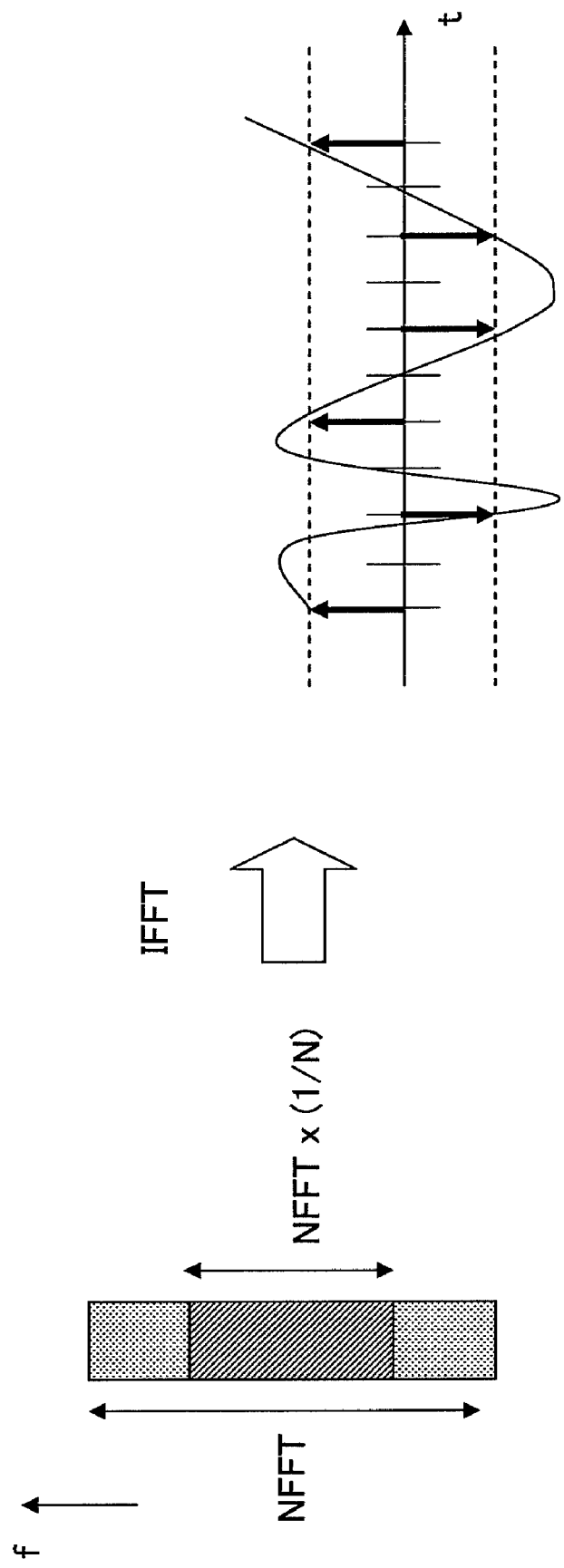

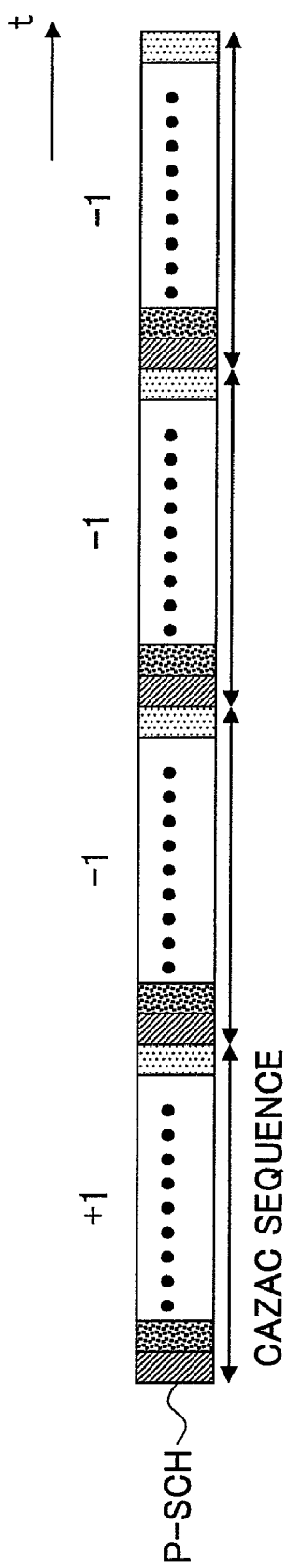

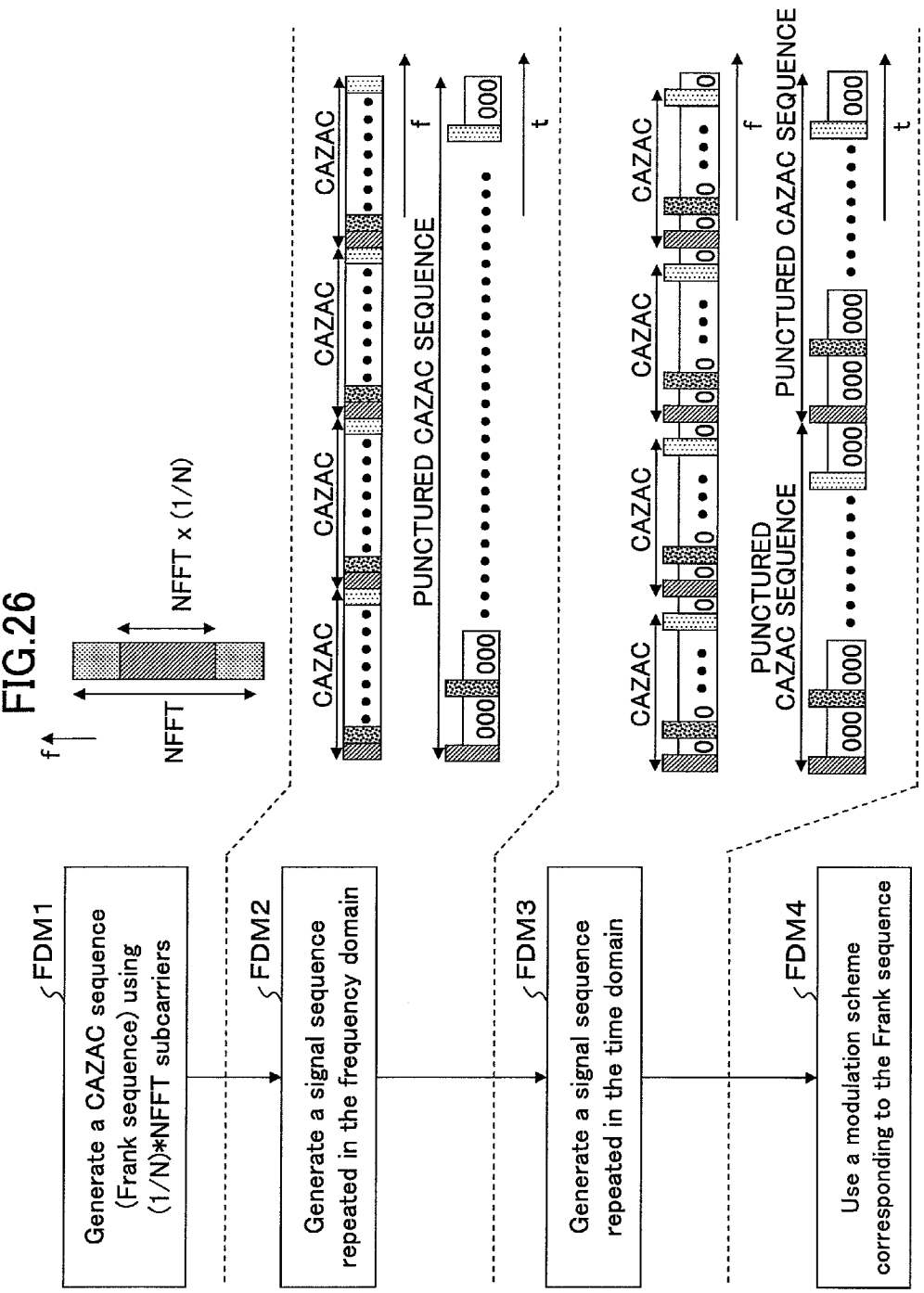

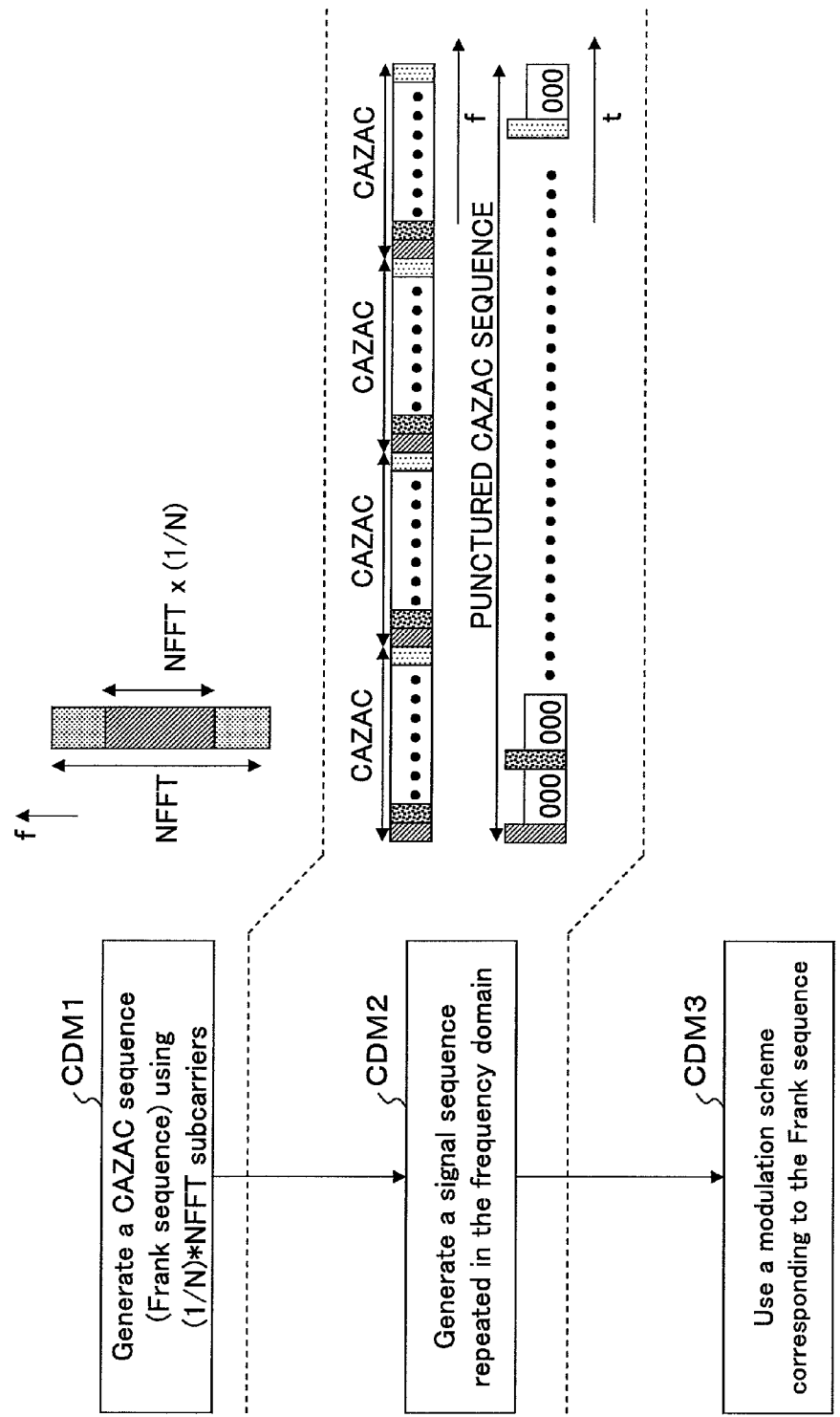

BASE STATION AND METHOD OF GENERATING A SYNCHRONIZATION CHANNEL

BACKGROUND OF THE INVENTION

1. Field of the Invention

The present invention relates to a base station for generating a synchronization channel and a method of generating a synchronization channel.

2. Description of the Related Art

In W-CDMA (Wideband Code Division Multiple Access), a mobile station performs cell search by means of a downlink physical channel referred to as a SCH (Synchronization Channel). The SCH includes two subchannels: a P-SCH (Primary SCH) and an S-SCH (Secondary SCH) (see "W-CDMA MOBILE COMMUNICATIONS SYSTEM" edited by Keiji Tachikawa, Japan, Mar. 15, 2002, page 112).

The P-SCH is used by the mobile station to detect slot timing. The S-SCH is used by the mobile station to detect frame timing and a scrambling code group. The mobile station achieves fast cell search by means of these two SCHs.

The P-SCH signal sequence and the S-SCH signal sequence are code-multiplexed in the time domain for transmission. The mobile station despreads the P-SCH signal sequence and the S-SCH signal sequence and separates them. Since the P-SCH signal sequence and the S-SCH signal sequence are code-multiplexed and transmitted at the same timing, they experience the same channel fluctuations. Accordingly, the mobile station can perform synchronous detection of the S-SCH signal sequence using the detected P-SCH signal sequence as a reference signal (pilot signal) upon correlation detection of the S-SCH signal sequence. In this manner, the S-SCH signal sequence is detected with high accuracy.

SUMMARY OF THE INVENTION

Problem(s) to be Solved by the Invention

In the future mobile access schemes, it is expected that OFDM (Orthogonal Frequency Division Multiplexing) modulation will be used, which has higher tolerance to multipath conditions. OFDM-modulated signals include various subcarrier signals in the time domain. It is desirable for the mobile station to quickly and easily detect the SCH signal sequence, even though OFDM-modulated signals include various subcarrier signals. Among other things, the workload in the mobile station needs to be reduced during cell search, because battery life (energy consumption) for the mobile station depends on the workload.

In view of the aforementioned problem in the related art, it is a general object of the present invention to reduce the workload in the mobile station under the condition that the P-SCH and the S-SCH are used as the SCH, while cell search can be quickly performed in the mobile station.

Means for Solving the Problem

In one aspect of the present invention, there is provided a base station, including:

a P-SCH basic waveform generating unit configured to generate, as a P-SCH basic waveform, a signal sequence in which codes with constant amplitude in a frequency domain are placed at intervals of a predetermined number of subcarriers;

a frequency-to-time transforming unit configured to transform the signal sequence into a time domain;

a code sequence multiplying unit configured to multiply the signal sequence transformed into the time domain with a predetermined code sequence;

a time-to-frequency transforming unit configured to retransform the signal sequence multiplied with the predetermined code sequence into the frequency domain;

an S-SCH generating unit configured to generate an S-SCH signal sequence; and a multiplexing unit configured to multiplex the signal sequence retransformed into the frequency domain and the S-SCH signal sequence.

In one aspect of the present invention, there is provided a method of generating a P-SCH signal sequence, including the steps of:

generating a CAZAC sequence within a bandwidth of (1/N)*NFFT centered at a center frequency in the frequency domain, where N represents an integer value and NFFT represents an FFT window size; and generating a repetitive sequence which is derived by repeating the CAZAC sequence in the frequency domain.

Effect of the Invention

According to an embodiment of the present invention, the workload in the mobile station can be reduced, while cell search can be quickly performed in the mobile station.

BRIEF DESCRIPTION OF THE DRAWINGS

FIG. 18B shows the P-SCH basic waveform which is transformed into the time domain in accordance with a fifth embodiment of the present invention.

FIG. 19B shows the signal sequence which is multiplied with a code sequence in accordance with any of the first through fourth embodiments of the present invention.

FIG. 26 shows a flowchart of a method of generating a synchronization channel in accordance with an embodiment of the present invention (FDM approach).

FIG. 27 shows a flowchart of a method of generating a synchronization channel in accordance with an embodiment of the present invention (CDM approach).

DESCRIPTION OF THE PREFERRED EMBODIMENTS

Figure 1:
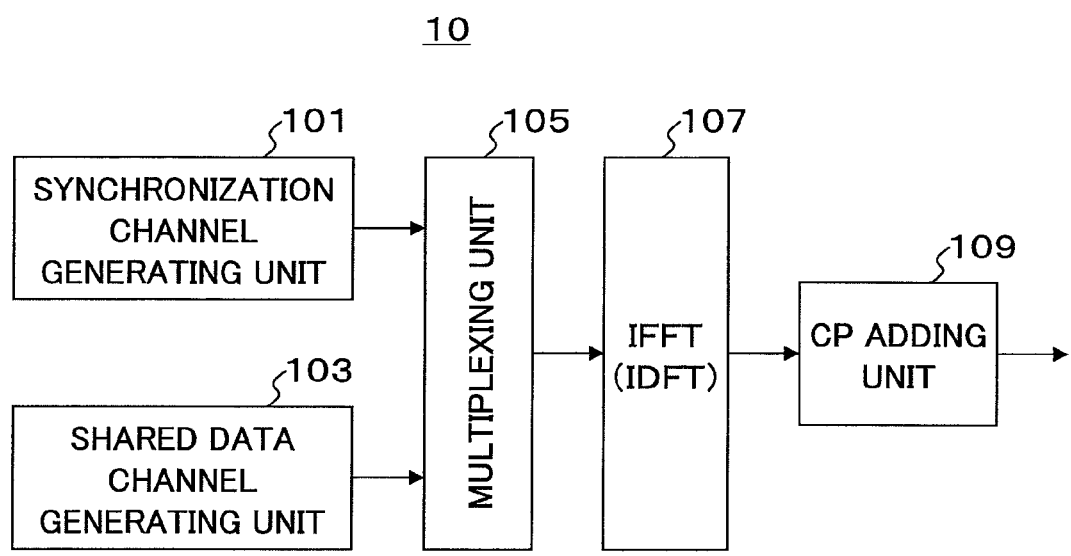
FIG. 1 shows a block diagram of a base station in accordance with an embodiment of the present invention.

Description of Notations 10 base station
101 synchronization channel generating unit
103 shared data channel generating unit
105 multiplexing unit
107 inverse fast Fourier transform unit
109 CP adding unit
20, 30 synchronization channel generating unit
201, 301 P-SCH basic waveform generating unit
203, 303 frequency-to-time transforming unit
205, 305 code sequence multiplying unit
207, 307 time-to-frequency transforming unit
209, 309 filter
211, 311 S-SCH generating unit
213, 313 scrambling code generating unit
215, 315 scrambling code multiplying unit
217, 317 multiplexing unit
40, 50 synchronization channel generating unit
401, 501 P-SCH basic waveform generating unit
403, 503 frequency-to-time transforming unit
405, 505 code sequence multiplying unit
407, 507 time-to-frequency transforming unit
409, 509 filter
411, 511 S-SCH generating unit
413, 513 scrambling code generating unit
415, 515 scrambling code multiplying unit
417, 517 multiplexing unit
421 spreading unit
60 mobile station
601 basic waveform correlation unit
603 synchronization signal replica generating unit
605 code sequence multiplying unit
607 upper layer code correlation unit
609 timing detecting unit
611 S-SCH detecting unit
25, 26, 27 synchronization channel generating unit
256 puncturing unit
278 code sequence multiplying unit

BEST MODE OF CARRYING OUT THE INVENTION

With reference to the accompanying drawings, a description is given below with regard to preferred embodiments of the present invention.

[Structure of Base Station and Requirements for SCH]

FIG. 1 shows a block diagram of a base station 10 in accordance with an embodiment of the present invention. The base station 10 includes a synchronization channel generating unit 101, a shared data channel generating unit 103, a multiplexing unit 105, an inverse fast Fourier transform (IFFT) unit 107, and a CP adding unit 109.

The synchronization channel generating unit 101 generates a SCH (Synchronization Channel) for use by a mobile station to perform cell search. As described above, the SCH includes a P-SCH (Primary SCH) and an S-SCH (Secondary SCH). The P-SCH is used by the mobile station to detect slot timing. The S-SCH is used by the mobile station to detect frame timing and a scrambling code group.

The multiplexing unit 105 multiplexes the SCH signal sequence generated by the synchronization channel generating unit 101 and shared data channel signal sequences generated by the shared data channel generating unit 103. The inverse fast Fourier transform unit 107 transforms the multiplexed signal sequences into orthogonal multicarrier signals. The CP adding unit 109 inserts CPs (Cyclic Prefixes) into the orthogonal multicarrier signals.

In order for the mobile station to achieve fast cell search with the received SCH signal sequence, the P-SCH signal sequence and the S-SCH signal sequence need to satisfy the following requirements.

(1) The SCH signal sequence uses cell-common codes to quickly detect SCH timing by means of replica-correlation, because timing detection by means of replica-correlation enables fast correlation processing.

(2) The S-SCH signal sequence is placed near the P-SCH signal sequence in the time or frequency domain, in order to perform synchronous detection of the S-SCH signal sequence using the P-SCH signal sequence as a reference signal.

(3) Since the P-SCH signal sequence is used as a reference signal upon synchronous detection of the S-SCH signal sequence, it is preferable that the P-SCH signal sequence have constant amplitude in the frequency domain, in order to avoid variations in the accuracy of channel estimation for each subcarrier.

(4) It is preferable to orthogonally multiplex the P-SCH signal sequence and the S-SCH signal sequence, in order to avoid interference. Similarly, it is also preferable to orthogonally multiplex the SCH signal sequence and the other channel signal sequences.

In addition, in order to reduce the workload for cell search in the mobile station, the P-SCH signal sequence needs to satisfy the following requirement.

(5) Since timing detection of SCH symbols by means of the P-SCH signal sequence is performed by means of replica-correlation in the time domain, the P-SCH signal sequence uses a basic waveform which is repeated Na times in the time domain. Consequently, the mobile station need not calculate full replica-correlation, and thus the workload in the mobile station can be reduced. The basic waveform which is repeated Na times may be sign-inverted for each repetition.

First Embodiment

With reference to FIGS. 2-7, a base station for generating an SCH signal sequence which satisfies the aforementioned requirements is described below in the case where the P-SCH signal sequence and the S-SCH signal sequence are multiplexed in the frequency domain (FDM approach).

Figure 2:
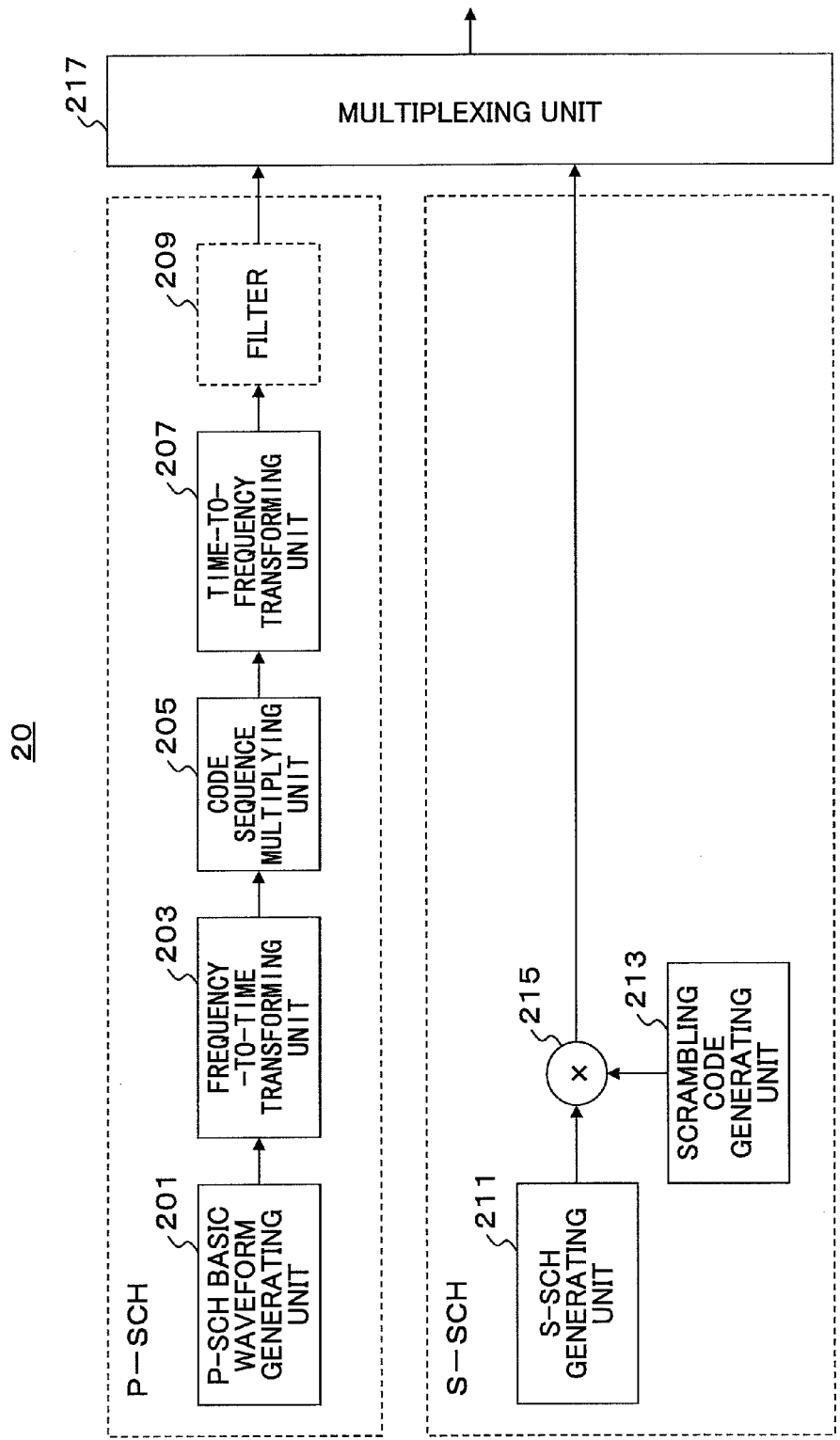
FIG. 2 shows a block-diagram of a synchronization channel generating unit in accordance with a first embodiment of the present invention.

FIG. 2 shows a synchronization channel generating unit 20 in the base station in accordance with a first embodiment of the present invention. The synchronization channel generating unit 20 includes a P-SCH basic waveform generating unit 201, a frequency-to-time transforming unit 203, a code sequence multiplying unit 205, a time-to-frequency transforming unit 207, a filter 209 (optional), an S-SCH generating unit 211, a scrambling code generating unit 213, a scrambling code multiplying unit 215, and a multiplexing unit 217. As described below, the synchronization channel generating unit 20 may not include the filter 209.

Figure 3:
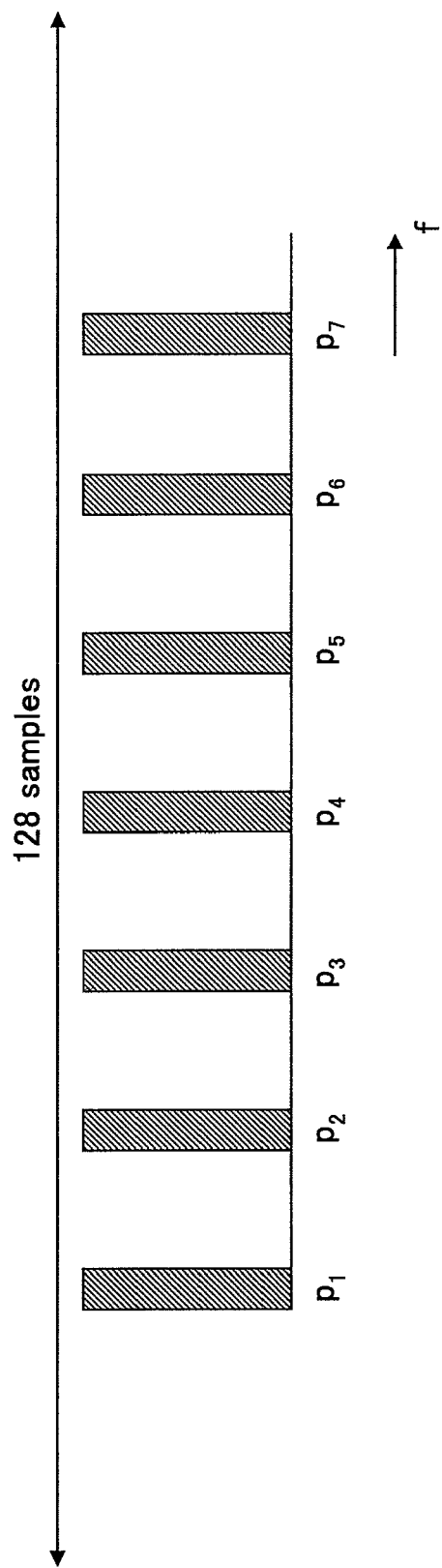
FIG. 3 shows a P-SCH basic waveform in the frequency domain (FDM approach).

The P-SCH basic waveform generating unit 201 generates, as a basic waveform, a signal sequence in which signals are placed at respective Na subcarrier intervals in the frequency domain. This signal sequence may be generated by means of codes with constant amplitude in the frequency domain such as a CAZAC (Constant Amplitude Zero AutoCorrelation) sequence. The use of the codes with constant amplitude in the frequency domain allows for good autocorrelation properties. Such codes (sequence) include a CAZAC sequence (Zadoff-Chu sequence, Frank sequence, etc.), PN codes (M sequence, Gold sequence), Truncated PN codes, and Golay codes. FIG. 3 shows an example of the basic waveform generated by the P-SCH basic waveform generating unit 201. Assuming that a waveform with 128 samples is eventually generated, the signals of the P-SCH signal sequence are placed at respective Na subcarrier intervals (Na=4 in FIG. 3) within the frequency domain of 128 samples.

Figure 4:
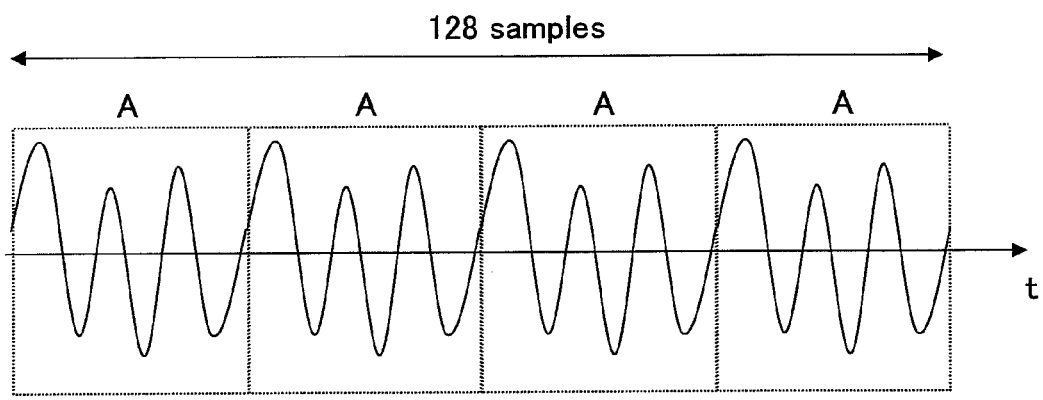
FIG. 4 shows the P-SCH basic waveform which is transformed into the time domain (FDM approach).

The frequency-to-time transforming unit 203 transforms the signal sequence generated by the P-SCH basic waveform generating unit 201 into the time domain by means of inverse fast Fourier transform (IFFT). FIG. 4 shows the waveform generated in this manner. The signal sequence transformed by the frequency-to-time transforming unit 203 has a waveform which is repeated Na times (Na=4 in FIG. 4) in the time domain. The use of the waveform repeated in the time domain allows the mobile station to avoid calculating full correlation at the timings of all the samples (128 samples).

Figure 5:
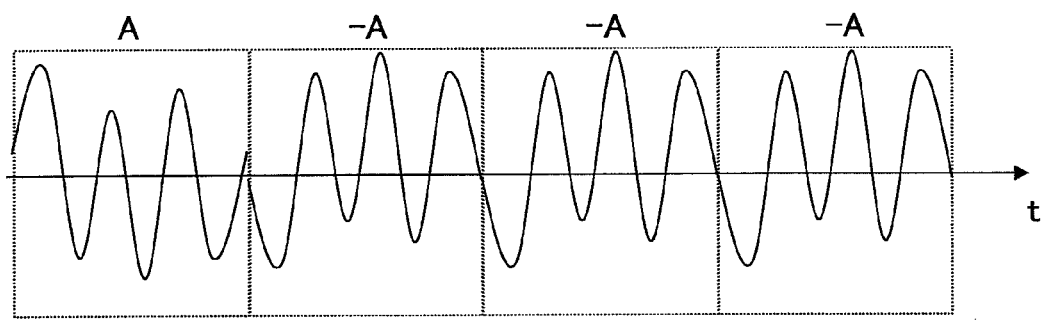
FIG. 5 shows the P-SCH signal sequence which is sign-inverted in the time domain (FDM approach).

It should be noted that the use of a waveform repeated simply in the time domain may degrade autocorrelation properties. For this reason, the code sequence multiplying unit 205 multiplies the signal sequence transformed into the time domain by the frequency-to-time transforming unit 203 with a code sequence (Walsh, CAZAC, etc.) for each repetition. Alternatively, the code sequence multiplying unit 205 may sign-invert the signal sequence transformed into the time domain. FIG. 5 shows the waveform sign-inverted in the time domain. Transforming the signal sequence in this manner allows the mobile station to perform replica-correlation of the P-SCH signal sequence, and thus the workload in the mobile station can be reduced. In addition, autocorrelation properties of the P-SCH signal sequence in the time domain can be improved (sharp correlation peaks can be derived).

Figure 6:
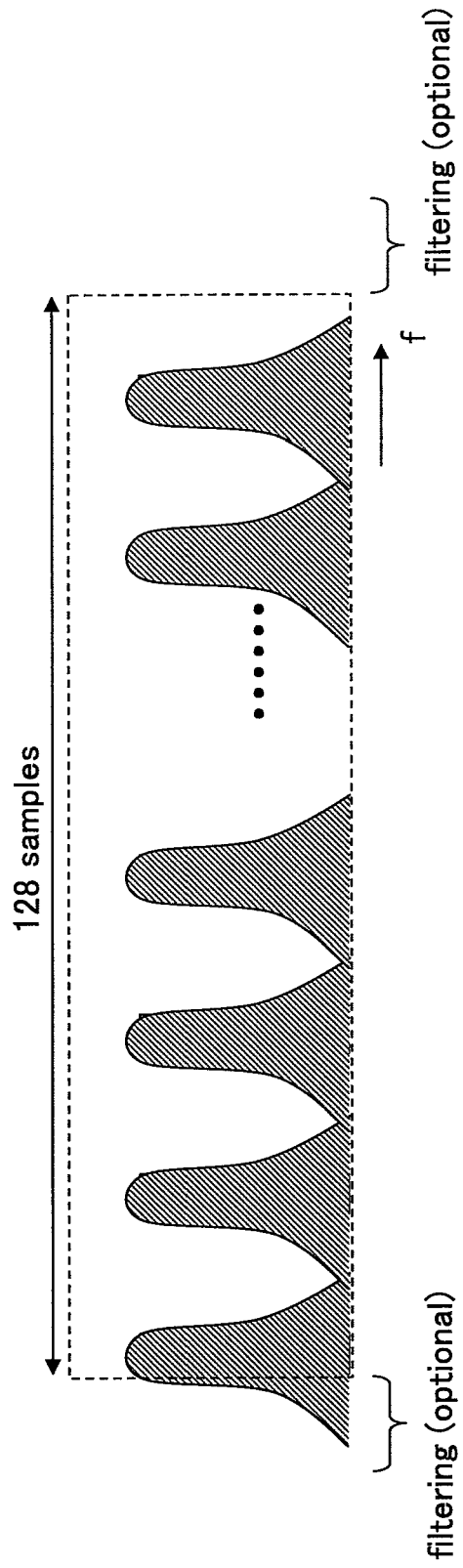
FIG. 6 shows the P-SCH signal sequence which is retransformed from the time domain into the frequency domain (FDM approach).
Figure 7:
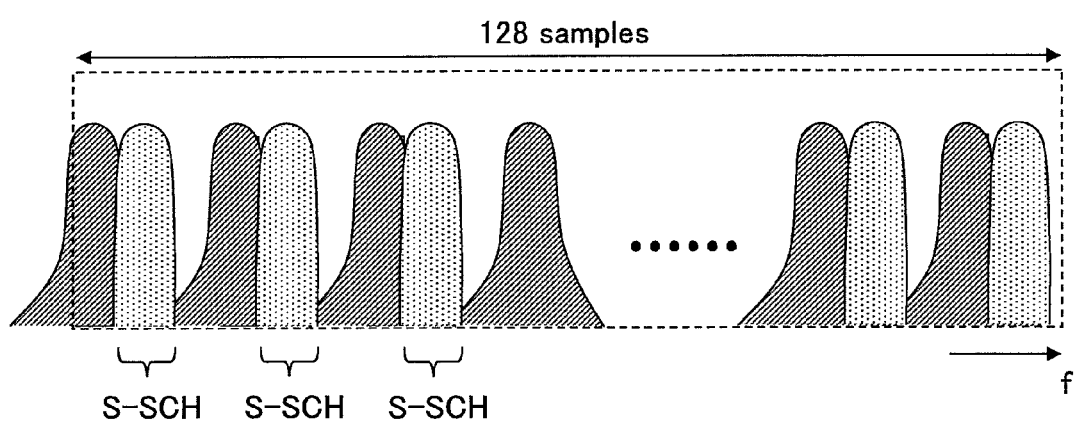
FIG. 7 shows the P-SCH signal sequence which is multiplexed along with the S-SCH signal sequence (FDM approach).

The time-to-frequency transforming unit 207 retransforms the signal sequence multiplied with the code sequence by the code sequence multiplying unit 205 into the frequency domain by means of Fourier transform (FFT). FIG. 6 shows the signal sequence retransformed into the frequency domain. As shown in FIG. 6, the signal sequence retransformed into the frequency domain results in a signal sequence in which signals are approximately placed at respective Na subcarrier intervals. In addition, the multiplication with the code sequence or the sign-inversion results in out-of-band components as shown in FIG. 6. The filter 209 may be used to eliminate the out-of-band components. The filter 209 can alleviate the effects on the other out-of-band channels, although the SCH signal sequence may be distorted. Alternatively, the filter 209 may not be used because the effects on the other out-of-band channels are small. Without the filter 209, the SCH signal sequence is not distorted.

The S-SCH generating unit 211 generates an S-SCH signal sequence. The scrambling code multiplying unit 215 multiplies the S-SCH signal sequence with a scrambling code generated by the scrambling code generating unit 213, as needed. The multiplication with the scrambling code can reduce peaks in the time domain or can reduce PAPR (peak-to-average power ratio).

The multiplexing unit 217 multiplexes the P-SCH signal sequence and the S-SCH signal sequence so that the S-SCH signal sequence is multiplexed into (placed on) all or part of subcarriers which have power close to zero among the signals of the signal sequence retransformed into the frequency domain as shown in FIG. 6.

According to the first embodiment, the base station can generate a synchronization channel which satisfies the aforementioned requirements. In addition, the workload in the mobile station can be reduced, while cell search can be quickly performed in the mobile station.

Second Embodiment

Figure 8:
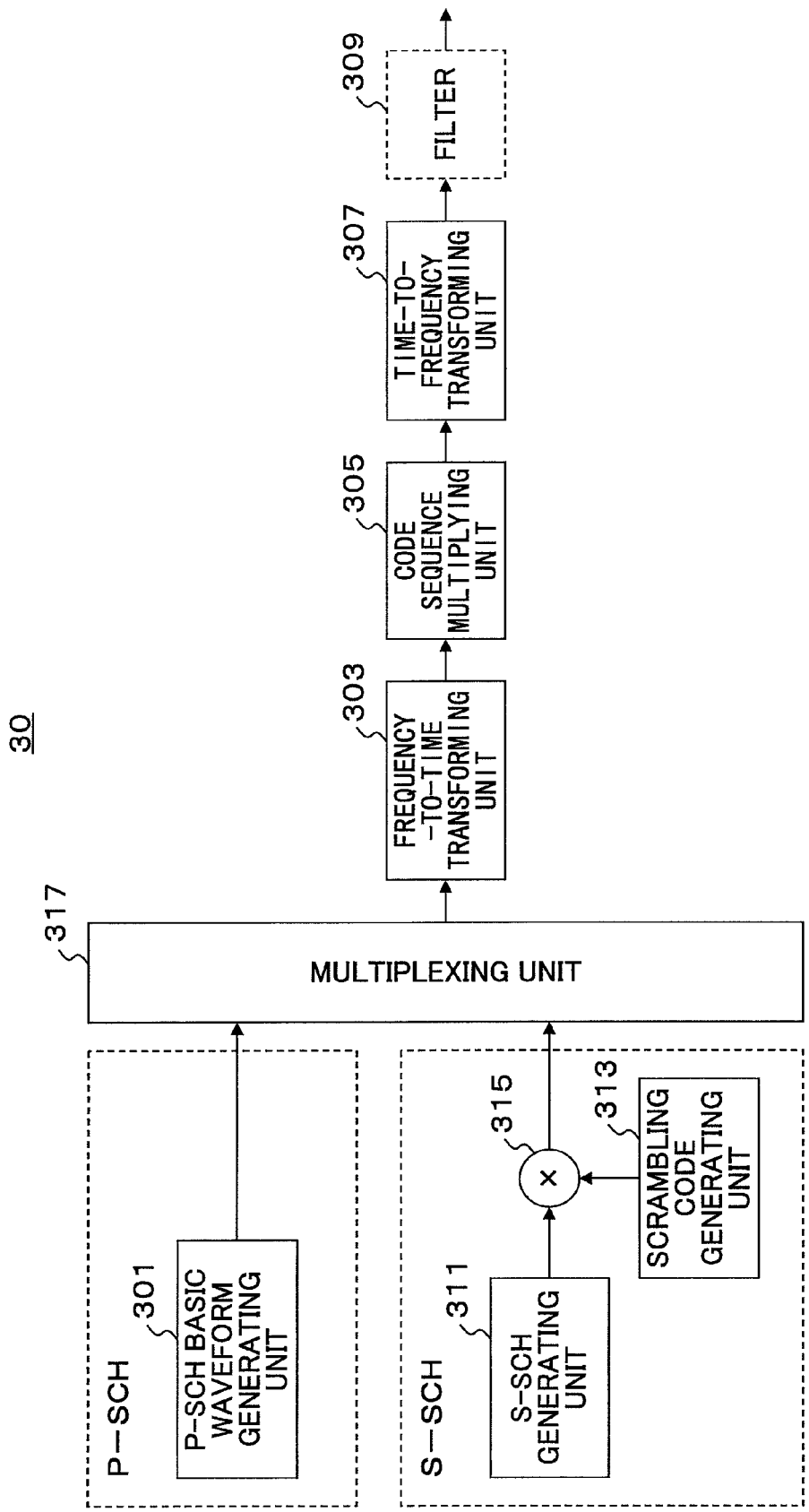
FIG. 8 shows a block diagram of a synchronization channel generating unit in accordance with a second embodiment of the present invention.

With reference to FIG. 8, a base station for generating the SCH signal sequence which satisfies the aforementioned requirements is described below in the case where the P-SCH signal sequence and the S-SCH signal sequence are multiplexed in the frequency domain (FDM approach).

FIG. 8 shows a synchronization channel generating unit 30 in the base station in accordance with a second embodiment of the present invention. The synchronization channel generating unit 30 includes a P-SCH basic waveform generating unit 301, a frequency-to-time transforming unit 303, a code sequence multiplying unit 305, a time-to-frequency transforming unit 307, a filter 309 (optional), an S-SCH generating unit 311, a scrambling code generating unit 313, a scrambling code multiplying unit 315, and a multiplexing unit 317. The basic function of each component in the synchronization channel generating unit 30 shown in FIG. 8 is identical with that of the corresponding component in the synchronization channel generating unit 20 shown in FIG. 2, except for the order of some components.

The P-SCH basic waveform generating unit 301 generates, as a basic waveform, a signal sequence in which signals are placed at respective Na subcarrier intervals in the frequency domain. This signal sequence may be generated by means of codes with constant amplitude in the frequency domain such as a CAZAC sequence. FIG. 3 shows the basic waveform generated in this manner.

The S-SCH generating unit 311 generates an S-SCH signal sequence. The scrambling code multiplying unit 315 multiplies the S-SCH signal sequence with a scrambling code generated by the scrambling code generating unit 313, as needed.

The multiplexing unit 317 multiplexes the P-SCH signal sequence and the S-SCH signal sequence so that the signals of the S-SCH signal sequence are multiplexed into (placed on) all or part of subcarriers which are not used for the P-SCH signal sequence in the frequency domain shown in FIG. 3.

The frequency-to-time transforming unit 303 transforms the signal sequences multiplexed by the multiplexing unit 317 into the time domain by means of inverse fast Fourier transform (IFFT). The P-SCH signal sequence among the signal sequences generated in this manner represents a waveform which is repeated Na times as shown in FIG. 4.

The code sequence multiplying unit 305 multiplies the signal sequences transformed into the time domain by the frequency-to-time transforming unit 303 with a code sequence such as a CAZAC sequence. Alternatively, the code sequence multiplying unit 305 may sign-invert the signal sequences transformed into the time domain. FIG. 5 shows the P-SCH waveform sign-inverted in the time domain.

The time-to-frequency transforming unit 307 retransforms the signal sequences multiplied with the code sequence by the code sequence multiplying unit 305 into the frequency domain by means of fast Fourier transform (FFT). FIG. 6 shows the P-SCH signal sequence retransformed into the frequency domain. The filter 309 may be used to eliminate the out-of-band components. Alternatively, the filter 309 may not be used because the effects on the other out-of-band channels are small.

According to the second embodiment, the base station can generate a synchronization channel which satisfies the aforementioned requirements. In addition, the workload in the mobile station can be reduced, while cell search can be quickly performed in the mobile station.

Third Embodiment

With reference to FIGS. 9-15, a base station for generating the SCH signal sequence which satisfies the aforementioned requirements is described below in the case where the P-SCH signal sequence and the S-SCH signal sequence are multiplexed in the code domain (CDM approach).

Figure 9:
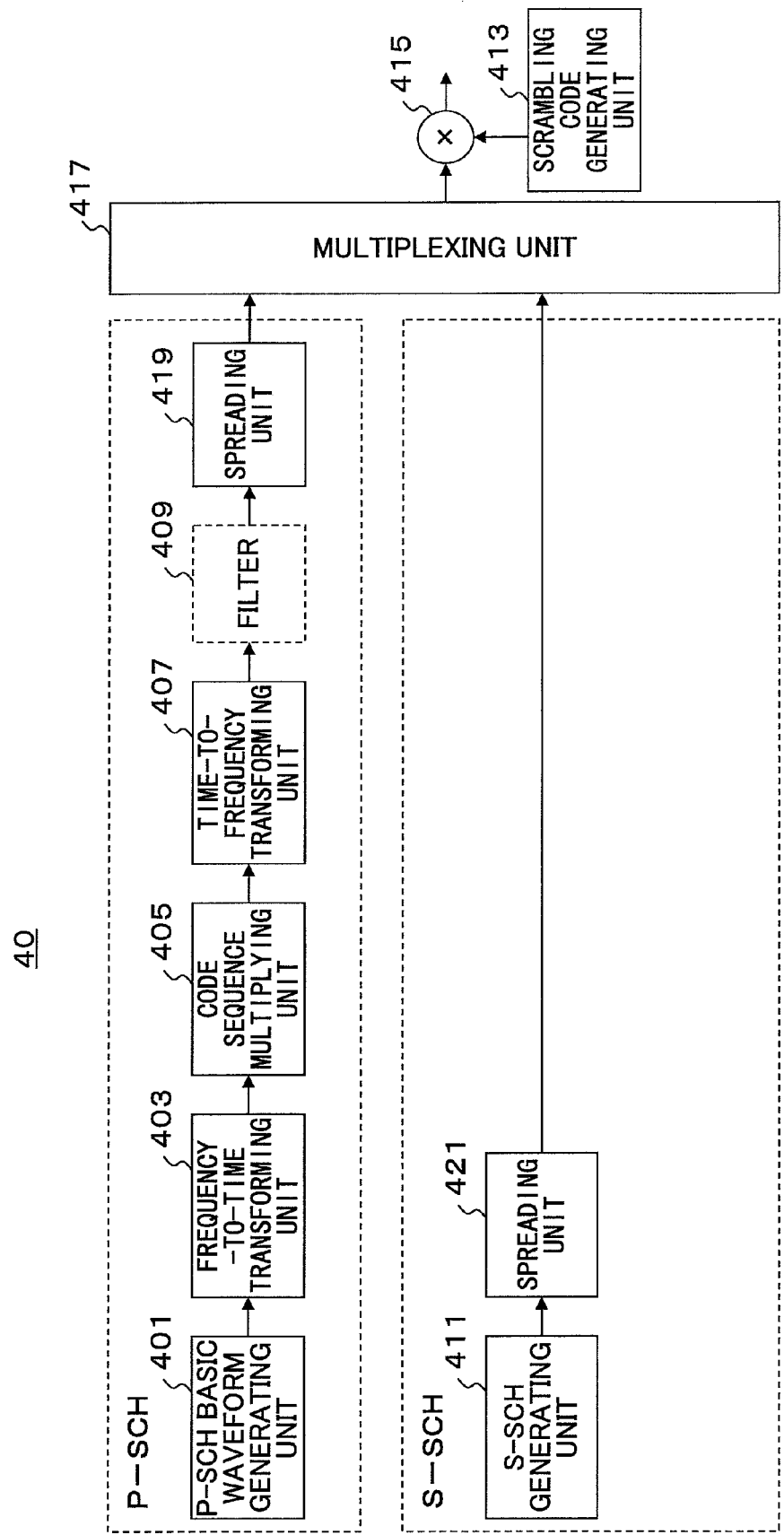
FIG. 9 shows a block diagram of a synchronization channel generating unit in accordance with a third embodiment of the present invention.

FIG. 9 shows a synchronization channel generating unit 40 in the base station in accordance with a third embodiment of the present invention. The synchronization channel generating unit 40 includes a P-SCH basic waveform generating unit 401, a frequency-to-time transforming unit 403, a code sequence multiplying unit 405, a time-to-frequency transforming unit 407, a filter 409 (optional), an S-SCH generating unit 411, a scrambling code generating unit 413, a scrambling code multiplying unit 415, a multiplexing unit 417, and spreading units 419 and 421.

Figure 10:
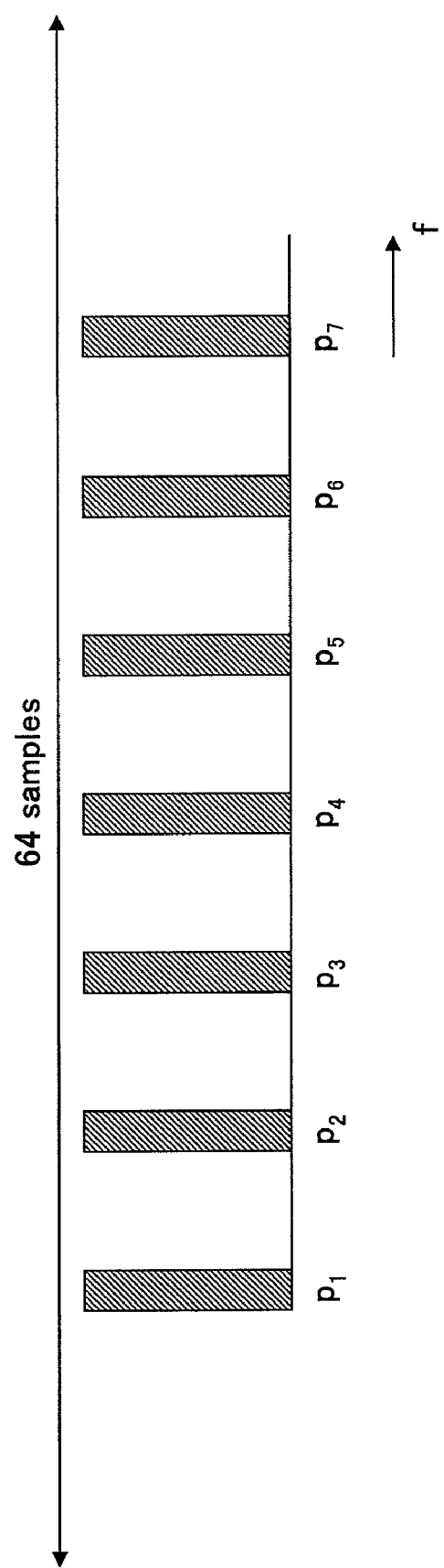
FIG. 10 shows a P-SCH basic waveform in the frequency domain (CDM approach).

The P-SCH basic waveform generating unit 401 generates, as a basic waveform, a signal sequence in which signals are placed at respective Na subcarrier intervals in the frequency domain. In the third embodiment, the P-SCH basic waveform generating unit 401 generates the signal sequence with a bandwidth which is derived by multiplying the synchronization channel bandwidth with 1/SF, where SF represents a spreading factor. This signal sequence may be generated by means of codes with constant amplitude in the frequency domain such as a CAZAC (Constant Amplitude Zero Auto-Correlation) sequence. FIG. 10 shows an example of the basic waveform generated by the P-SCH basic waveform generating unit 401. Assuming that the spreading factor is equal to 2 and that a waveform with 128 samples is eventually generated, the signals of the P-SCH signal sequence are placed at respective Na subcarrier intervals (Na=4 in FIG. 3) within the frequency domain of 64 samples.

Figure 11:
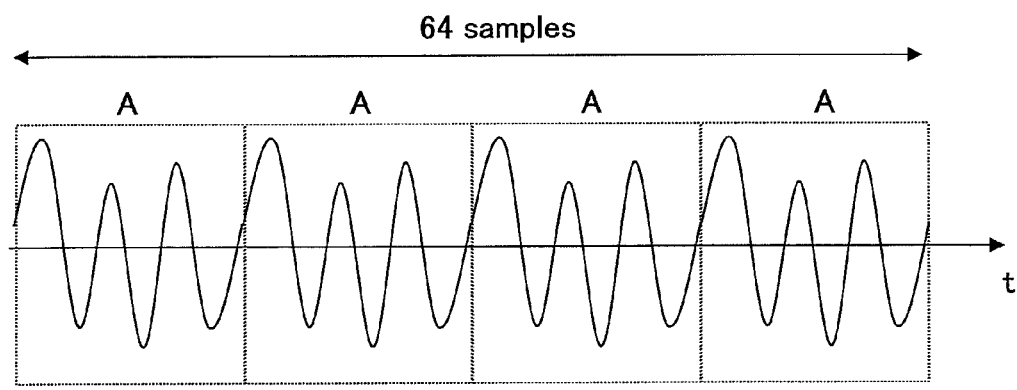
FIG. 11 shows the P-SCH basic waveform which is transformed into the time domain (CDM approach).

The frequency-to-time transforming unit 403 transforms the signal sequence generated by the P-SCH basic waveform generating unit 401 into the time domain by means of inverse fast Fourier transform (IFFT). FIG. 11 shows the waveform generated in this manner. The signal sequence transformed by the frequency-to-time transforming unit 403 has a waveform which is repeated Na times (Na=4 in FIG. 11) in the time domain.

Figure 12:
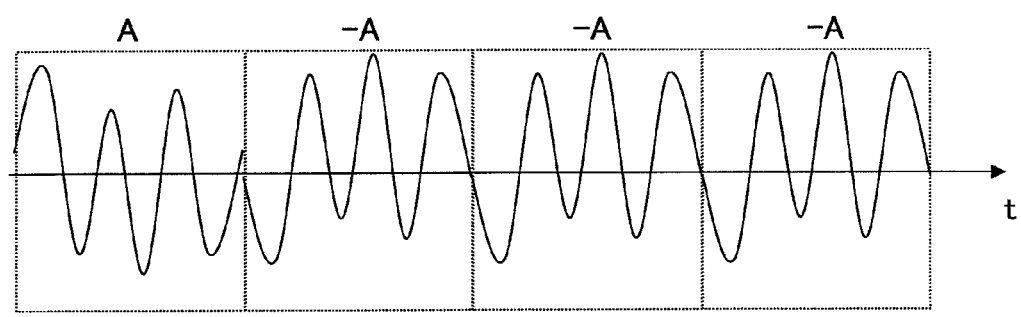
FIG. 12 shows the P-SCH signal sequence which is sign-inverted in the time domain (CDM approach).

The code sequence multiplying unit 405 multiplies the signal sequence transformed into the time domain by the frequency-to-time transforming unit 403 with a code sequence such as a CAZAC sequence. Alternatively, the code sequence multiplying unit 405 may sign-invert the signal sequence transformed into the time domain. FIG. 12 shows the waveform sign-inverted in the time domain. Transforming the signal sequence in this manner allows the mobile station to perform replica-correlation of the P-SCH signal sequence, and thus the workload in the mobile station can be reduced. In addition, autocorrelation properties of the P-SCH signal sequence in the time domain can be improved (sharp correlation peaks can be derived).

Figure 13:
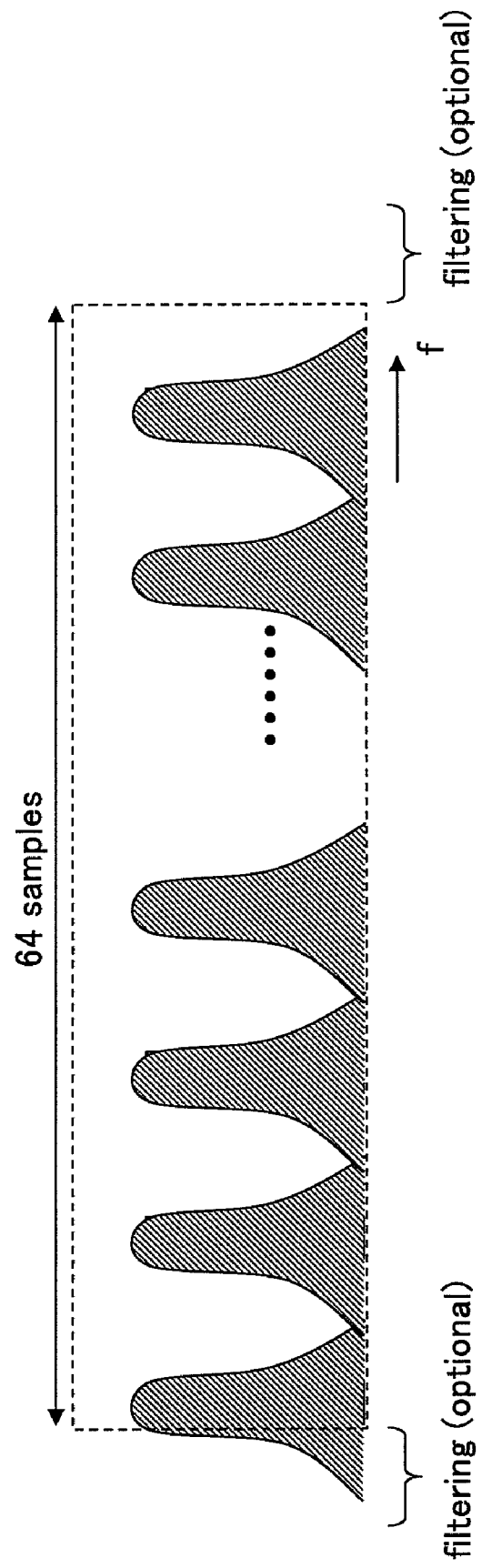
FIG. 13 shows the P-SCH signal sequence which is retransformed from the time domain into the frequency domain (CDM approach).

The time-to-frequency transforming unit 407 retransforms the signal sequence multiplied with the code sequence by the code sequence multiplying unit 405 into the frequency domain by means of fast Fourier transform (FFT). FIG. 13 shows the signal sequence retransformed into the frequency domain. As shown in FIG. 13, the signal sequence retransformed into the frequency domain results in a signal sequence in which signals are approximately placed at respective Na subcarrier intervals. In addition, the multiplication with the code sequence or the sign-inversion results in out-of-band components as shown in FIG. 13. The filter 409 may be used to eliminate the out-of-band components. The filter 409 can alleviate the effects-on the other out-of-band channels, although the SCH signal sequence may be distorted. Alternatively, the filter 409 may not be used because the effects on the other out-of-band channels are small. Without the filter 409, the SCH signal sequence is not distorted.

Figure 14:
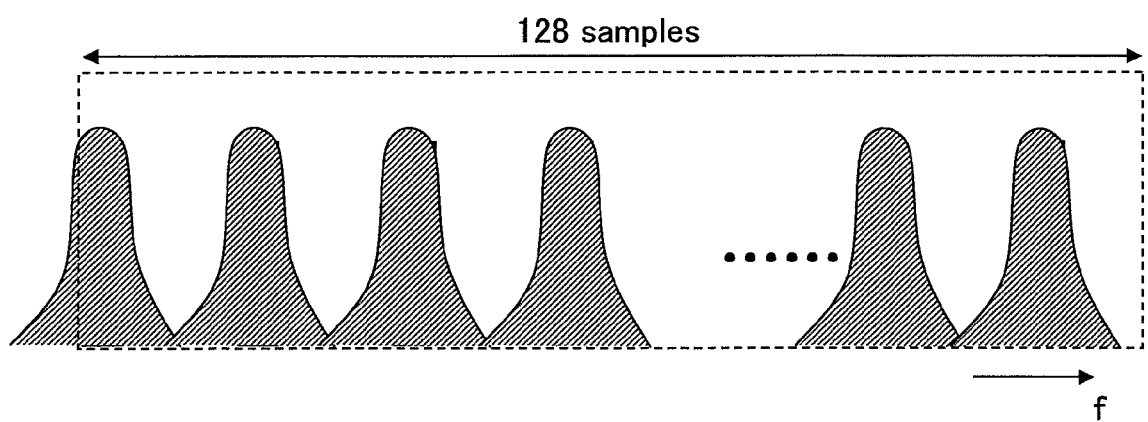
FIG. 14 shows the spread P-SCH signal sequence (CDM approach).
Figure 15:
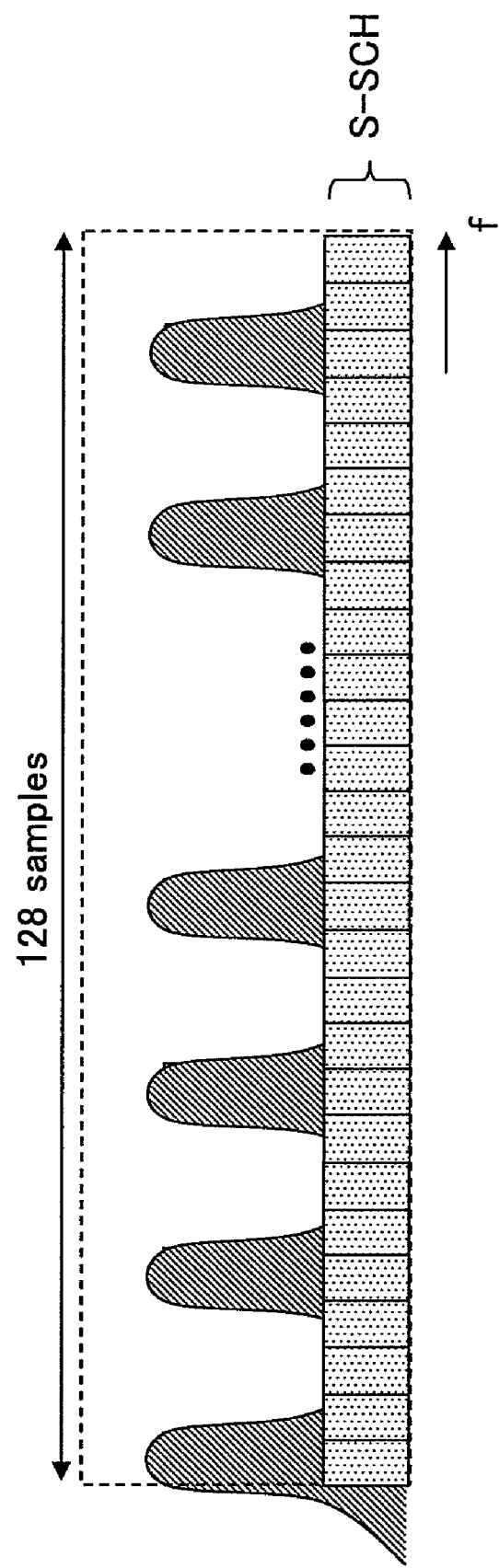
FIG. 15 shows the P-SCH signal sequence which is multiplexed along with the S-SCH signal sequence (CDM approach).

The spreading unit 419 spreads the signal sequence retransformed into the frequency domain with the spreading factor. FIG. 14 shows the spread signal sequence in the frequency domain. Since the spreading factor is equal to 2, the signal sequence with 128 samples is derived as shown in FIG. 14.

The S-SCH generating unit 411 generates the S-SCH signal sequence with the bandwidth of the 1/SF-times synchronization channel bandwidth. The spreading unit 421 spreads the signal sequence generated by the S-SCH generating unit 411 with the spreading factor.

The multiplexing unit 417 multiplexes the signal sequence spread by the spreading unit 419 and the S-SCH signal sequence in the code domain.

The scrambling code multiplying unit 415 multiplies the signal sequences multiplexed by the multiplexing unit 417 with a scrambling code generated by the scrambling code generating unit 413, as needed. The multiplication with the scrambling code can reduce peaks in the time domain or can reduce PAPR (peak-to-average power ratio).

According to the third embodiment, the base station can generate a synchronization channel which satisfies the aforementioned requirements. In addition, the workload in the mobile station can be reduced, while cell search can be quickly performed in the mobile station.

Fourth Embodiment

Figure 16:
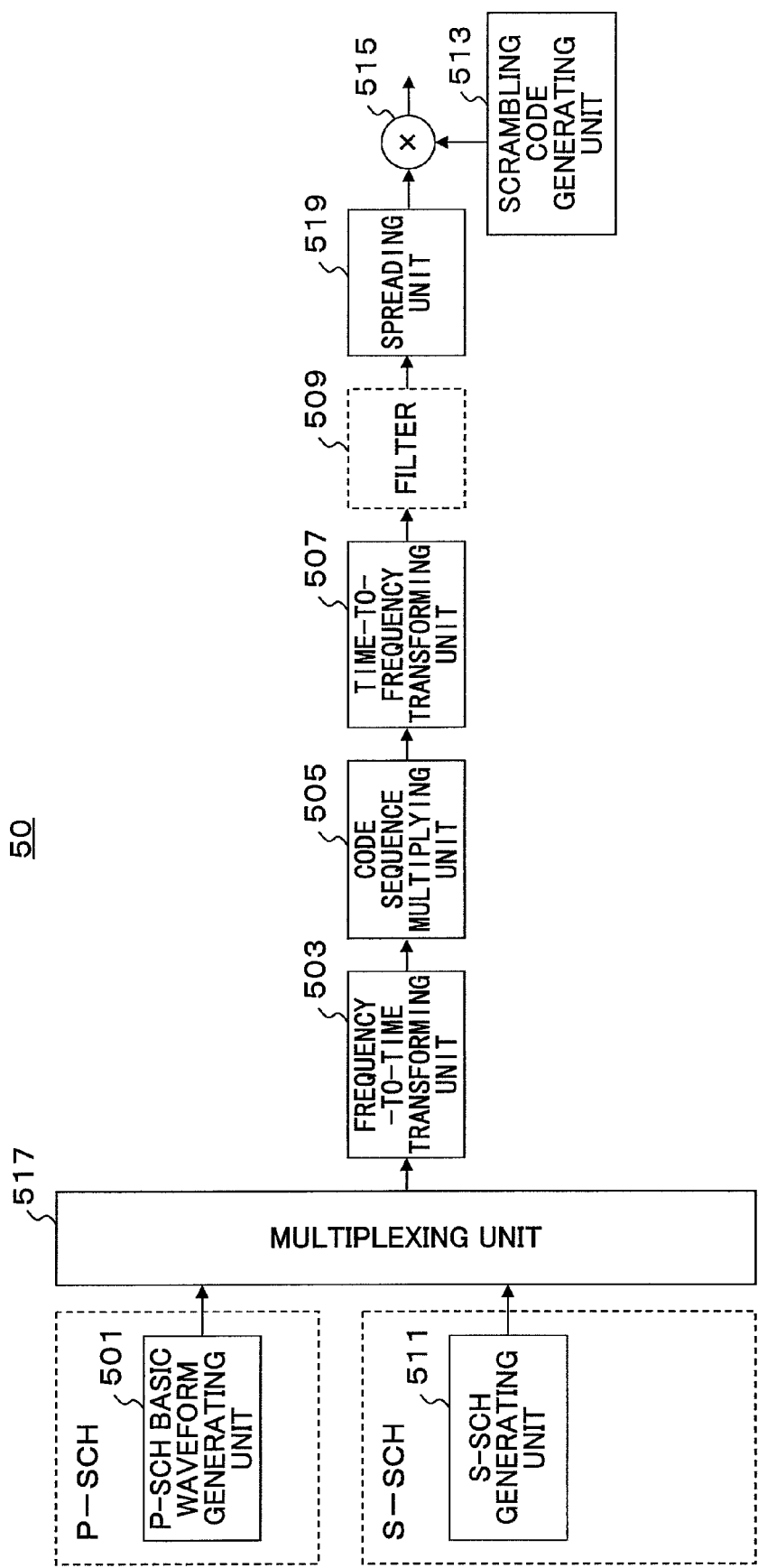
FIG. 16 shows a block diagram of a synchronization channel generating unit in accordance with a fourth embodiment of the present invention.

With reference to FIG. 16, a base station for generating an SCH signal sequence which satisfies the aforementioned requirements is described below in the case where the P-SCH signal sequence and the S-SCH signal sequence are multiplexed in the code domain (CDM approach).

FIG. 16 shows a synchronization channel generating unit 50 in the base station in accordance with a fourth embodiment of the present invention. The synchronization channel generating unit 50 includes a P-SCH basic waveform generating unit 501, a frequency-to-time transforming unit 503, a code sequence multiplying unit 505, a time-to-frequency transforming unit 507, a filter 509 (optional), an S-SCH generating unit 511, a scrambling code generating unit 513, a scrambling code multiplying unit 515, a multiplexing unit 517, and a spreading unit 519. The basic function of each component in the synchronization channel generating unit 50 shown in FIG. 16 is identical with that of the corresponding component in the synchronization channel generating unit 40 shown in FIG. 9, except for the order of some components.

The P-SCH basic waveform generating unit 501 generates, as a basic waveform, a signal sequence in which signals are placed at respective Na subcarrier intervals in the frequency domain. In the fourth embodiment, the P-SCH basic waveform generating unit 501 generates the signal sequence with a bandwidth which is derived by multiplying the synchronization channel bandwidth with 1/SF, where SF represents a spreading factor. This signal sequence may be generated by means of codes with constant amplitude in the frequency domain such as a CAZAC sequence. FIG. 10 shows the basic waveform generated in this manner.

The S-SCH generating unit 511 generates an S-SCH signal sequence with the bandwidth of the 1/SF-times synchronization channel bandwidth.

The multiplexing unit 517 multiplexes the P-SCH signal sequence and the S-SCH signal sequence in the code domain.

The frequency-to-time transforming unit 503 transforms the signal sequences multiplexed by the multiplexing unit 517 into the time domain by means of inverse fast Fourier transform (IFFT). The P-SCH signal sequence among the signal sequences generated in this manner represents a waveform which is repeated Na times as shown in FIG. 11.

The code sequence multiplying unit 505 multiplies the signal sequences transformed into the time domain by the frequency-to-time transforming unit 503 with a code sequence such as a CAZAC sequence. Alternatively, the code sequence multiplying unit 505 may sign-invert the signal sequences transformed into the time domain. FIG. 12 shows the P-SCH waveform sign-inverted in the time domain.

The time-to-frequency transforming unit 507 retransforms the signal sequences multiplied with the code sequence by the code sequence multiplying unit 505 into the frequency domain by means of fast Fourier transform (FFT). FIG. 13 shows the P-SCH signal sequence retransformed into the frequency domain. The filter 509 may be used to eliminate the out-of-band components. Alternatively, the filter 509 may not be used because the effects on the other out-of-band channels are small.

The spreading unit 519 spreads the signal sequences retransformed into the frequency domain with the spreading factor. FIG. 14 shows the spread signal sequence in the frequency domain.

The scrambling code multiplying unit 515 multiplies the signal sequences with a scrambling code generated by the scrambling code generating unit 513, as needed.

According to the fourth embodiment, the base station can generate a synchronization channel which satisfies the aforementioned requirements. In addition, the workload in the mobile station can be reduced, while cell search can be quickly performed in the mobile station.

[Structure of Mobile Station]

Figure 17:
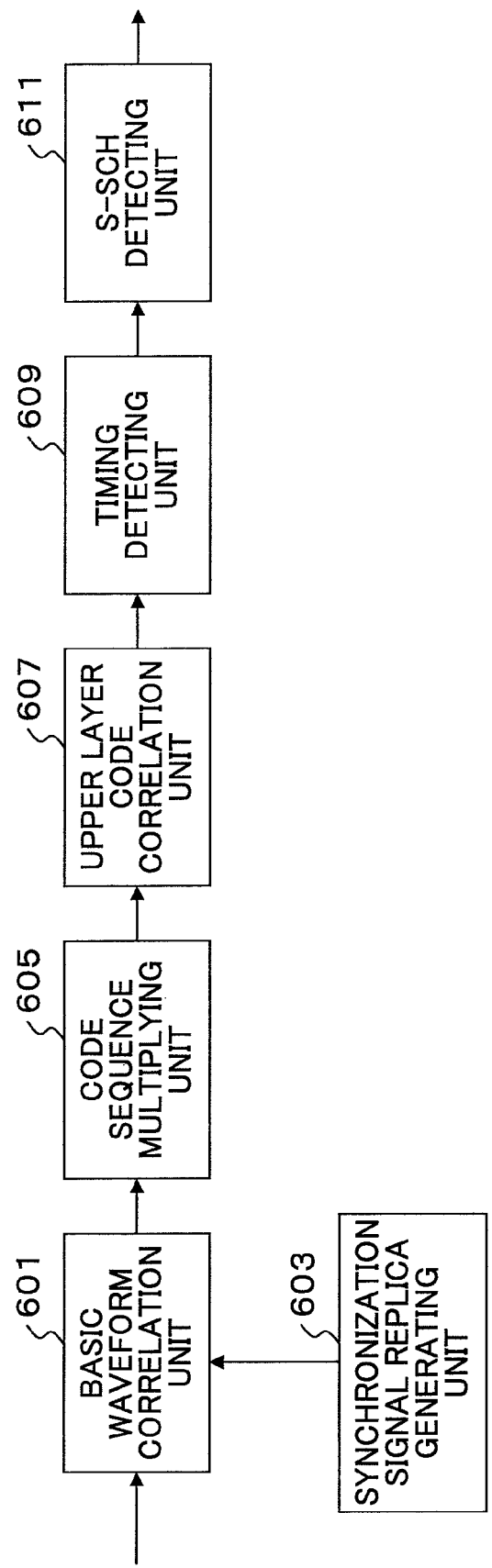
FIG. 17 shows a block diagram of a mobile station in accordance with an embodiment of the present invention.

FIG. 17 shows a block diagram of a mobile station 60 in accordance with an embodiment of the present invention. The mobile station 60 includes a basic waveform correlation unit 601, a synchronization signal replica generating unit 603, a code sequence multiplying unit 605, an upper layer code correlation unit 607, a timing detecting unit 609, and an S-SCH detecting unit 611.

The mobile station 60 supplies multicarrier signals received by an antenna to the basic waveform correlation unit 601. The synchronization signal replica generating unit 603 generates predefined synchronization signal replicas corresponding to the basic waveform and sequentially supplies them to the basic waveform correlation unit 601. The basic waveform generating unit 601 performs correlation detection between the received multicarrier signals and the synchronization signal replicas. The code sequence multiplying unit 605 multiplies the output from the basic waveform generating unit 601 with a code sequence. Alternatively, the code sequence multiplying unit 605 may sign-invert the output. The upper layer code correlation unit 607 performs correlation detection between the output from the code sequence multiplying unit 605 and upper layer code. In this manner, the mobile station 60 can perform replica-correlation of the P-SCH signal sequence.

The timing detecting unit 609 detects P-SCH timing based on correlation values. When the timing of the P-SCH signal sequence is detected, the S-SCH detecting unit 611 detects the S-SCH signal sequence using the P-SCH signal sequence as a reference signal (synchronous detection). It should be noted that the mobile station 60 needs to descramble the signal sequences after synchronous detection if the base station scrambles the signal sequences.

Fifth Embodiment

As described in the first through fourth embodiments, the base station generates, as a P-SCH basic waveform, a signal sequence in which signals are placed at respective Na subcarrier intervals in the frequency domain. Then, the base station transforms the signal sequence into the time domain to generate a waveform repeated in the time domain. The use of the waveform repeated in the time domain allows the mobile station to perform replica-correlation of the P-SCH signal sequence, and thus the workload in the mobile station can be reduced. However, with the use of the waveform simply repeated in the time domain the following problem may still need to be faced.

Typically, OFDM signals have the property of large PAPR (Peak-to-Average Power Ratio) in the time domain. In other words, the amplitude of the OFDM signals varies significantly. Accordingly, the multiplication with a real number (complex number) is needed for correlation processing. The multiplication requires a large number of operations. In order to reduce the number of operations for correlation processing in the mobile station, it is preferable that a signal waveform have constant amplitude at the timings of sampling in the mobile station.

Figure 18A:
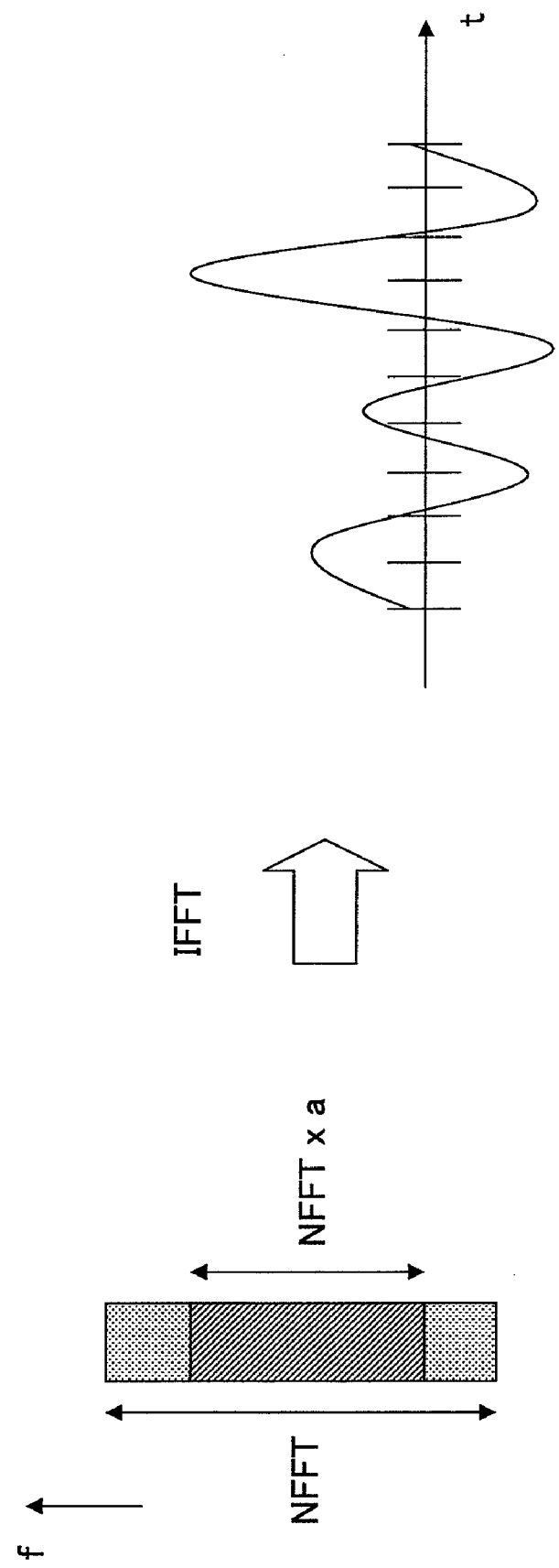
FIG. 18A shows the P-SCH basic waveform which is transformed into the time domain using a bandwidth of several tens percent of an FFT window size.

In a fifth embodiment, a synchronization channel generating unit in the base station for generating a signal waveform with constant amplitude at respective N-sample intervals is described below with reference to FIGS. 2, 18A, and 18B.

Typically, a bandwidth of several tens percent of NFFT (NFFT*a) is used for OFDM signals in order to facilitate the filtering process, where NFFT represents an FFT window size used for transmitting or receiving the OFDM signals. The FFT window size represents a range within which the OFDM signals are processed by means of FFT. For example, the bandwidth of NFFT corresponds to the bandwidth with 128 samples in FIG. 3. According to 3GPP Evolved UTRA and UTRAN, for example, assuming that NFFT is equal to 512 in the case of 5 MHz band frequencies, 58.6% (=300/512) of subcarriers are used for the range of the FFT window size. When the P-SCH basic waveform is generated within this range and transformed by means of inverse fast Fourier transform, the amplitude varies significantly at the timings of sampling, as shown in FIG. 18A.

In the fifth embodiment, the P-SCH basic waveform generating unit 201 (FIG. 2) uses only (1/N)*NFFT subcarriers centered at a center frequency in the time domain, where N represents an integer value. The P-SCH basic waveform generating unit 201 generates a P-SCH basic waveform using a code sequence such as a CAZAC sequence. When the frequency-to-time transforming unit 203 transforms the P-SCH basic waveform by means of inverse fast Fourier transform, points with constant amplitude are derived at respective N-sample intervals, as shown in FIG. 18B. Accordingly, when the mobile station detects P-SCH timing during cell search, the mobile station can assume that signals with constant amplitude are used for correlation processing at respective N-sample intervals.

Although N may be any integer value, it is preferable that N be equal to 2, since (1/N) is close to 58.6% defined according to 3GPP Evolved UTRA and UTRAN. In this case, points with constant amplitude are derived at respective two-sample intervals.

In addition, the P-SCH basic waveform generating unit 201 preferably generates the P-SCH basic waveform using a Frank sequence within (1/N)*NFFT subcarriers. The Frank sequence is one of CAZAC sequences and expressed as follows.

The length of the sequence: $N=m^2$ (m: any positive integer value)

The number of phases: $A=m$

The sequence: $a_k(k=0, 1, 2, \ldots, N-1)=\exp(-j2\pi r^* l_k/m)$

Where r and m are relatively prime positive integer values (r<m), j represents a complex number, and $l_k$ represents the following m*m weighting matrix.

$$l_k = \begin{pmatrix} 1 & 2 & 3 & 4 & \ldots & m \\ 2 & 4 & 6 & 8 & \ldots & 2m \\ 3 & 6 & 9 & 12 & \ldots & 3m \\ 4 & 8 & 12 & 16 & \ldots & 4m \\ \vdots & \vdots & \vdots & \vdots & \ddots & \vdots \\ m & \ldots & \ldots & \ldots & \ldots & m^2 \end{pmatrix}$$

Using the Frank sequence, points with constant amplitude on the IQ (In-Phase Quadrature-Phase) plane are derived at the respective N-sample intervals after data modulation, as shown in FIG. 18B. For example, when the Frank sequence with N=4 is modulated by means of BPSK modulation, two points with constant amplitude of (+1, −1) on the IQ plane are derived. When the Frank sequence with N=16 is modulated by means of QPSK modulation, four points with constant amplitude on the IQ plane are derived. Similarly, when the Frank sequence with N=64 is modulated by means of 8PSK modulation, eight points with constant amplitude on the IQ plane are derived. Accordingly, the mobile station can reduce the number of operations during cell search.

Although the fifth embodiment is described in terms of the P-SCH basic waveform generating unit 201 shown in FIG. 2, the aforementioned operations may be performed in the P-SCH basic waveform generating units 301, 401, and 501 shown in FIGS. 8, 9, and 16. In either case, the mobile station can assume that signals with constant amplitude are used for correlation processing.

It should be noted that the base station can orthogonalize the P-SCH signal sequence and the other channel signal sequences in the frequency domain using (1/N)*NFFT subcarriers for the P-SCH signal sequence. In addition, the base station can orthogonally multiplex the P-SCH signal sequence and the S-SCH signal sequence, because the P-SCH signal sequence in the frequency domain corresponds to a CAZAC sequence within (1/N)*NFFT subcarriers.

Sixth Embodiment

Figure 19A:
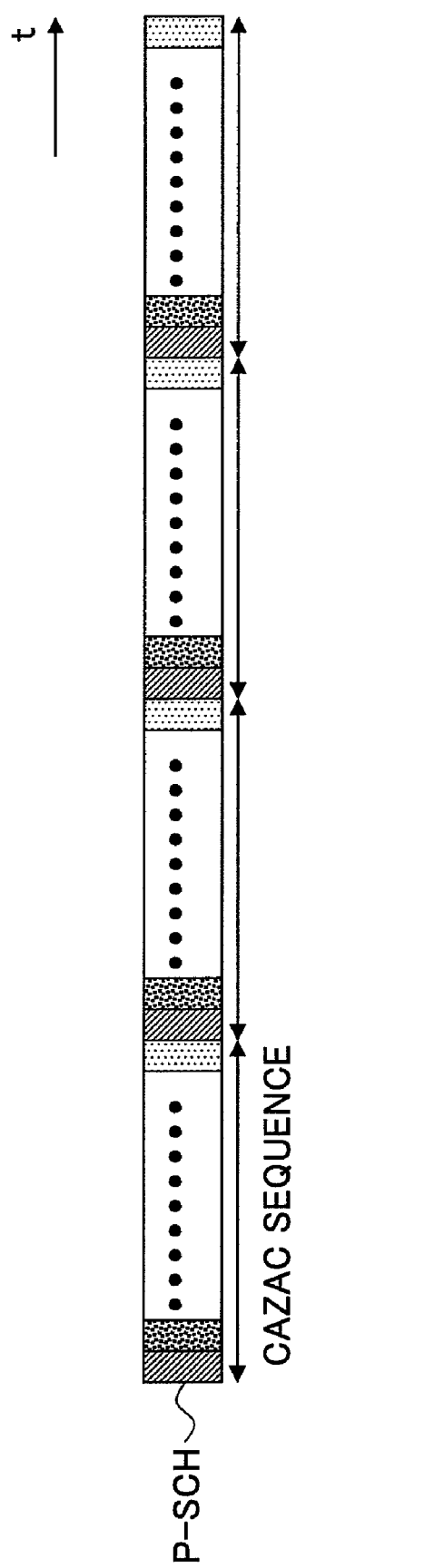
FIG. 19A shows a signal sequence which is transformed into the time domain in accordance with any of the first through fourth embodiments of the present invention.

As described in the first through fourth embodiments, the multiplication of the signal sequence transformed into the time domain with the code sequence improves autocorrelation properties. Specifically, the CAZAC sequence with signals at respective Na subcarrier intervals is transformed into the time domain in order to derive the signal sequence repeated in the time domain, as shown in FIG. 19A. The multiplication of the signal sequence with the code sequence results in a signal sequence as shown in FIG. 19B. The use of this signal sequence improves autocorrelation properties. However, amplitude may vary in the frequency domain.

In a sixth embodiment, a synchronization channel generating unit in the base station for maintaining constant amplitude in the frequency domain without degrading autocorrelation properties is described below with reference to FIGS. 20-25.

Figure 20:
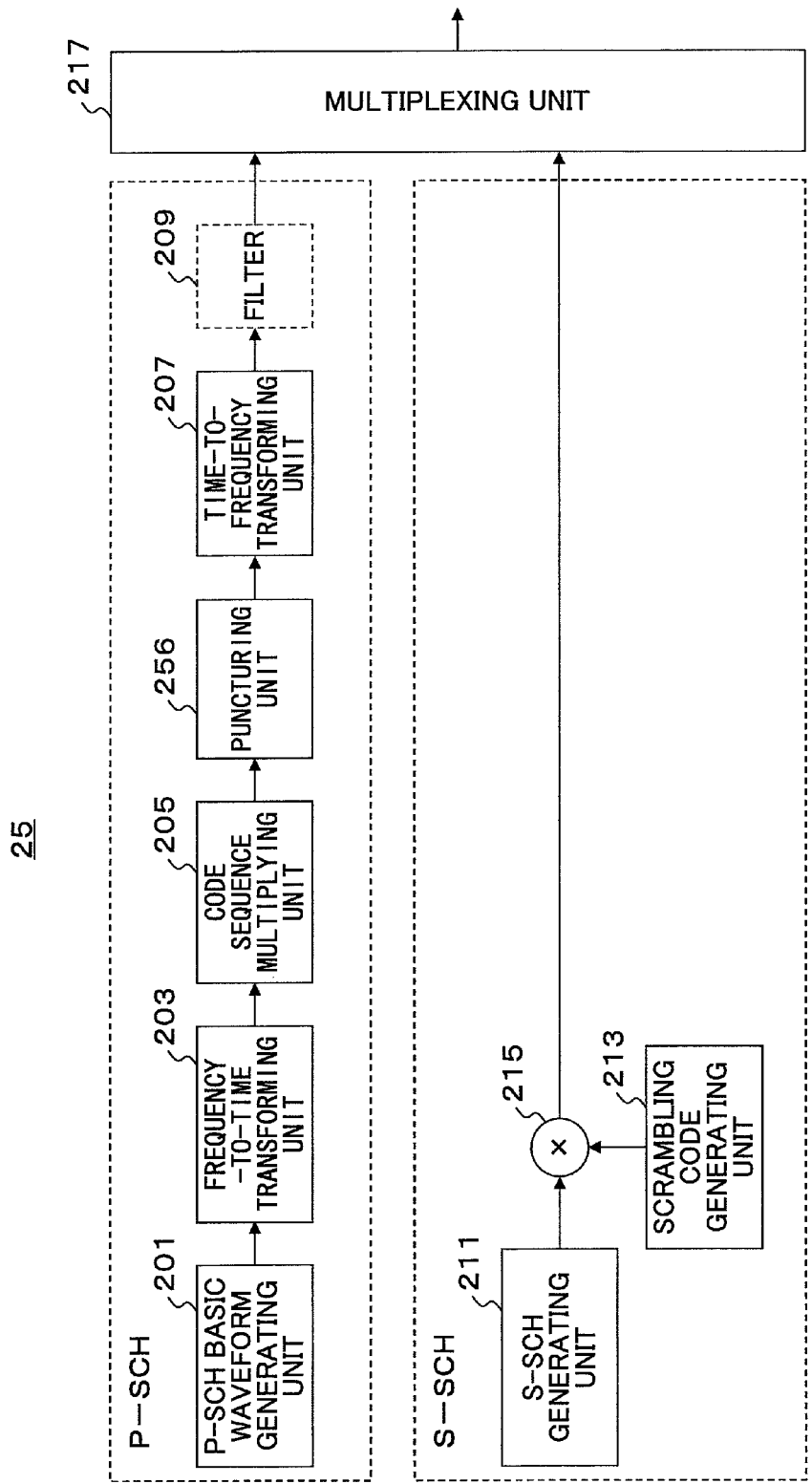
FIG. 20 shows a block diagram of a synchronization channel generating unit in accordance with a sixth embodiment of the present invention.
Figure 21:
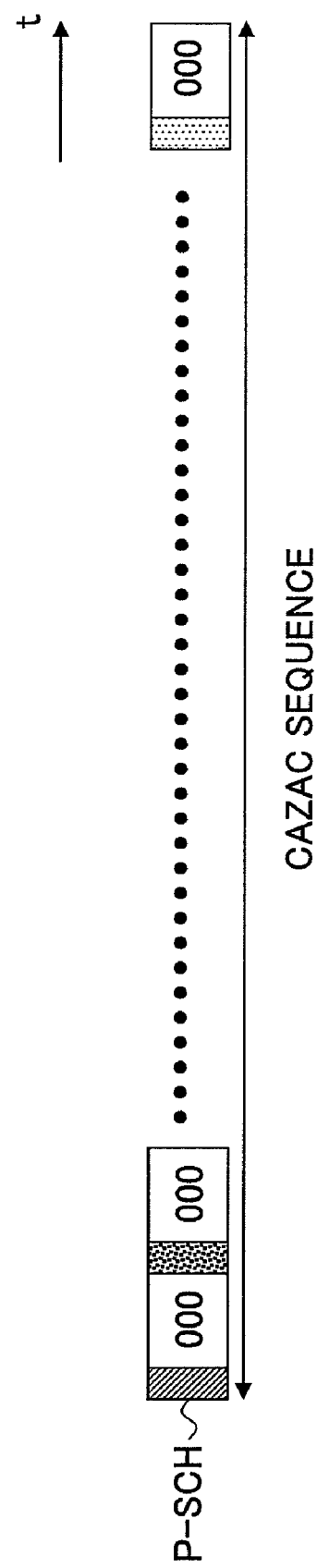
FIG. 21 shows the signal sequence which is punctured in the time domain in accordance with the sixth embodiment of the present invention.

FIG. 20 shows a synchronization channel generating unit 25 for maintaining constant amplitude in the frequency domain. The synchronization channel generating unit 25 includes a puncturing unit 256 in addition to the components for the synchronization channel generating unit 20 shown in FIG. 2. The puncturing unit 256 punctures (thins out) the signal sequence to have 1/Ni of the original size, where Ni is an integer value. FIG. 21 shows a signal sequence which is punctured to have ¼ of the original size. When the time-to-frequency transforming unit 207 retransforms the punctured signal sequence into the frequency domain, the CAZAC sequence is repeated Ni times in the frequency domain. For example, when the time-to-frequency transforming unit 207 retransforms the signal sequence punctured to have ¼ of the original size, the CAZAC sequence is repeated four times in the frequency domain. In this manner, constant amplitude can be maintained in the frequency domain. In addition, the same replica waveform can be used when the bandwidth is increased from 1.25 MHz to 2.5 MHz or 5 MHz. Furthermore, since null (zero) values are derived by puncturing the signal sequence in the time domain, the number of operations can be reduced. On the contrary, this approach has a disadvantage of high peak power because of the discrete waveform in the time domain.

Figure 22:
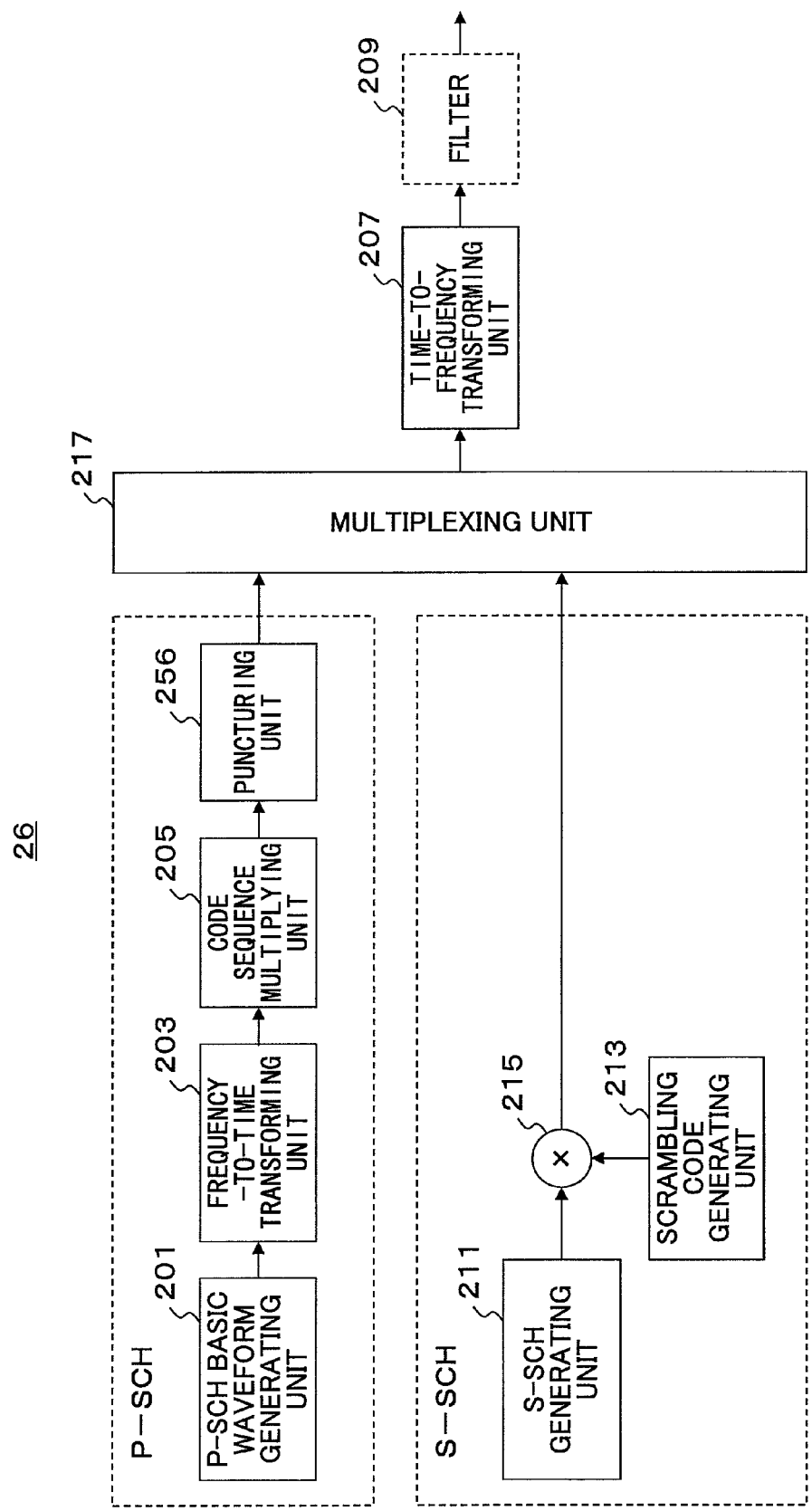
FIG. 22 shows a block diagram of another synchronization channel generating unit in accordance with the sixth embodiment of the present invention.
Figure 23:
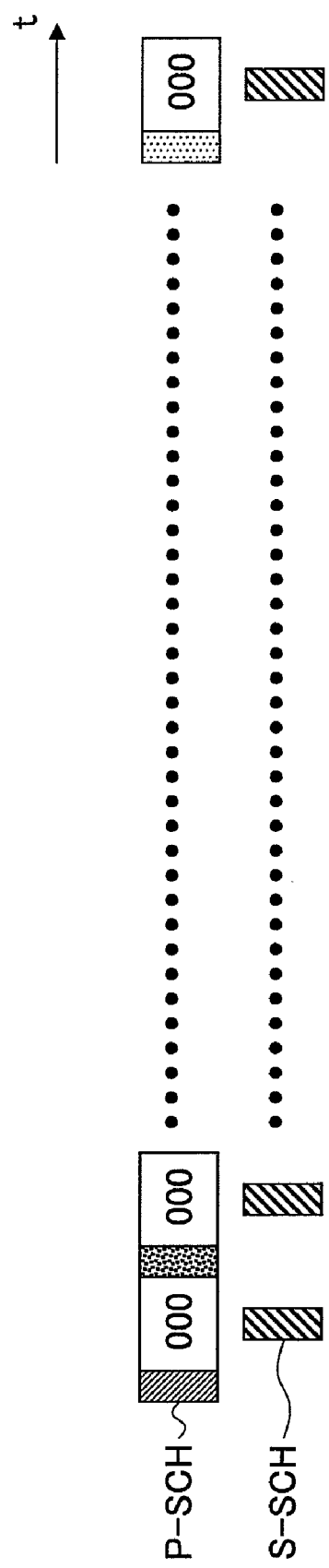
FIG. 23 shows the P-SCH signal sequence which is multiplexed along with the S-SCH signal sequence in the time domain in accordance with the sixth embodiment of the present invention.

FIG. 22 shows a synchronization channel generating unit 26 in the base station for reducing peak power. The synchronization channel generating unit 26 shown in FIG. 22 is identical with the synchronization channel generating unit 25 shown in FIG. 20, except for the position of the multiplexing unit 217. The multiplexing unit 217 multiplexes the P-SCH signal sequence and the S-SCH signal sequence so that total peak power is reduced. FIG. 23 shows a signal sequence multiplexed along with the S-SCH signal sequence in the time domain. Multiplexing the S-SCH signal sequence in this manner can avoid the discrete waveform in the time domain and can reduce peak power.

Figure 24:
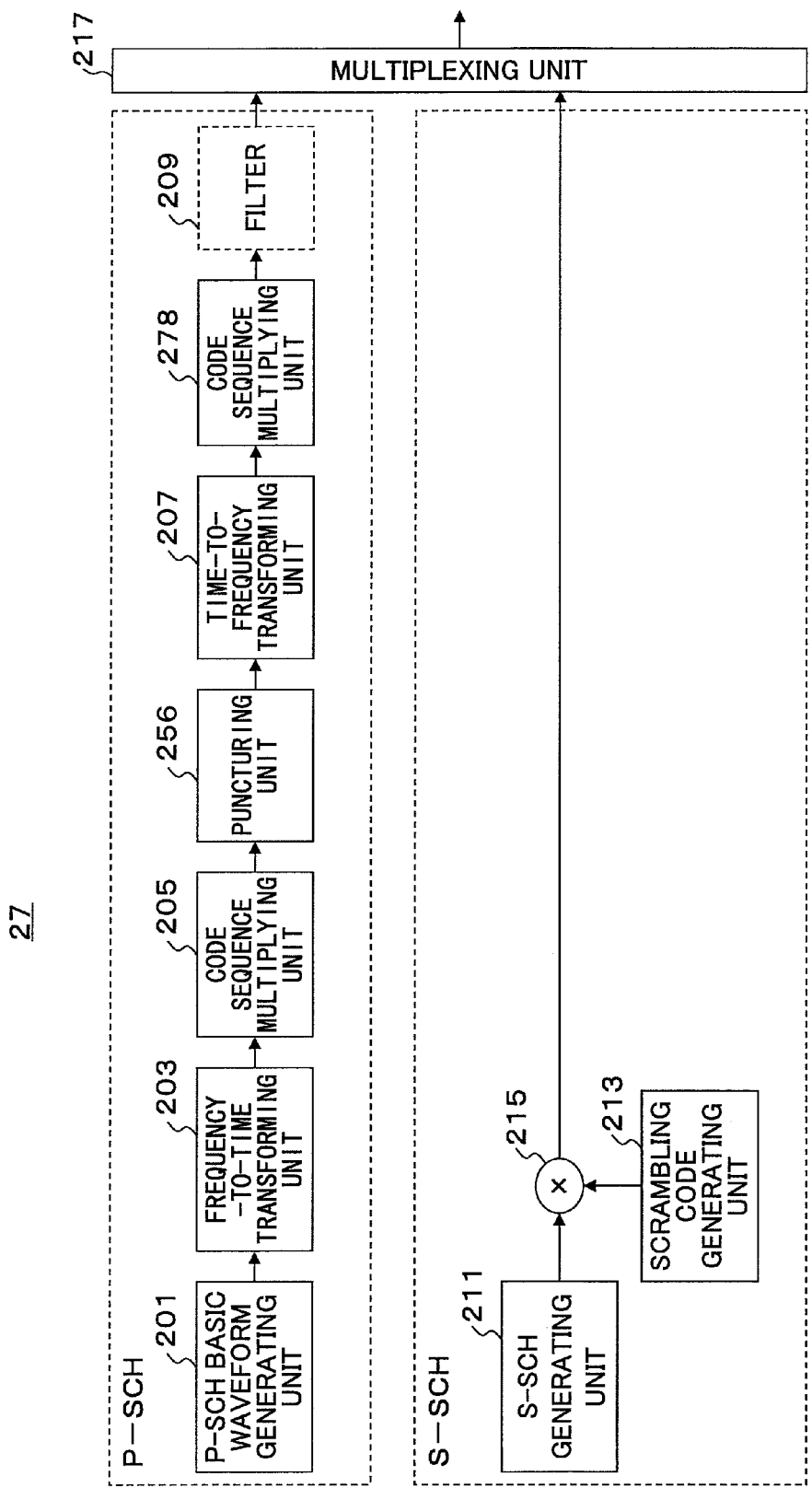
FIG. 24 shows a block diagram of another synchronization channel generating unit in accordance with the sixth embodiment of the present invention.
Figure 25:
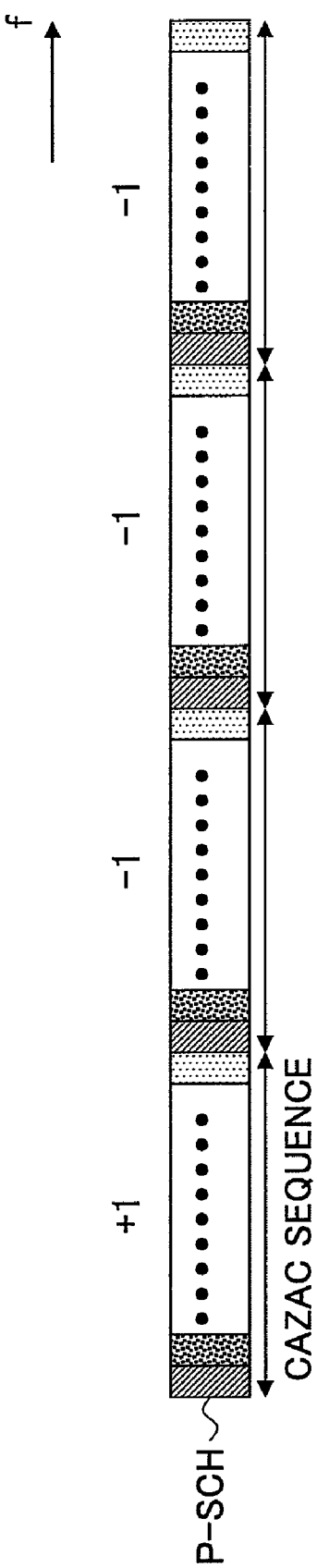
FIG. 25 shows the signal sequence which is multiplied with a code sequence in the frequency domain in accordance with the sixth embodiment of the present invention.

FIG. 24 shows another synchronization channel generating unit 27 in the base station for reducing peak power. The synchronization channel generating unit 27 shown in FIG. 24 is identical with the synchronization channel generating unit 25 shown in FIG. 20, except for a code sequence multiplying unit 278. The code sequence multiplying unit 278 multiplies the CAZAC sequence repeated in the frequency domain with a code sequence. FIG. 25 shows a signal sequence multiplied with the code sequence in the frequency domain. Multiplying the signal sequence with the code sequence can avoid the discrete waveform in the time domain and can reduce peak power.

The approach for multiplexing the P-SCH signal sequence and the S-SCH signal sequence as shown in FIGS. 22 and 23 can be combined with the approach for multiplying the signal sequence with the code sequence as shown in FIGS. 24 and 25, by providing the code sequence multiplying unit 278 shown in FIG. 24 subsequent to the time-to-frequency transforming unit 207 shown in FIG. 22.

Although the sixth embodiment is described in terms of a variation of the synchronization channel generating unit 20 shown in FIG. 2, a similar effect can be achieved by providing the puncturing unit 256 in front of the time-to-frequency transforming units 307, 407, and 507 as well as providing the code sequence multiplying unit 278 subsequent to the time-to-frequency transforming units 307, 407, and 507 in the synchronization channel generating units 30, 40, and 50 shown in FIGS. 8, 9, and 16.

[Summary of Requirements for P-SCH]

As described in the aforementioned embodiments, it is preferable that the P-SCH signal sequence satisfy the following requirements.

(1) The P-SCH signal sequence has good autocorrelation properties in order to detect SCH timing with high accuracy. Sharper correlation peaks can improve timing detection.

(2) The P-SCH signal sequence can reduce the number of operations during SCH timing detection. It should be noted that SCH timing detection can be performed with high accuracy by means of replica-correlation. Accordingly, The P-SCH signal sequence needs to use signals which can reduce the number of operations regarding replica-correlation.

(3) The P-SCH signal sequence has constant amplitude in the frequency domain, in order to improve the accuracy of channel estimation upon detecting the S-SCH signal sequence. It should be noted that accurate detection of the S-SCH signal sequence can be achieved by using the P-SCH signal sequence as a reference signal for channel estimation and performing synchronous detection of the S-SCH signal sequence. Consequently, accurate channel estimation can be achieved by using the P-SCH signal sequence with constant amplitude in the frequency domain.

In order to satisfy requirement (1) of good autocorrelation in the time domain, the P-SCH signal sequence needs to have (almost) constant amplitude in the frequency domain. As described in the first embodiment, a code sequence such as a CAZAC sequence may be used to satisfy requirement (1). When requirement (1) is satisfied, requirement (3) is also satisfied.

In order to satisfy requirement (2), the number of operations needs to be reduced. As described in the first embodiment, a signal sequence repeated in the time domain may be used to satisfy requirement (2). As described in the sixth embodiment, a signal sequence with null values in the time domain (a signal sequence repeated in the frequency domain) may be further used.

In addition, in order to satisfy requirement (2), the number of operations for each correlation processing may be reduced. As described in the fifth embodiment, a signal sequence such as a CAZAC sequence within (1/N)*NFFT subcarriers may be used to satisfy requirement (2), where NFFT represents an FFT window size. Furthermore, in order to reduce the number of operations for each of N samples, a Frank sequence may be used.

[Method of Generating a P-SCH Signal Sequence in the Case where the P-SCH Signal Sequence and an S-SCH Signal Sequence are Multiplexed in the Frequency Domain]

The base station preferably generates a P-SCH signal sequence as shown in FIG. 26, when the P-SCH signal sequence and an S-SCH signal sequence are multiplexed in the frequency domain.

Step FDM1: The base station generates a CAZAC sequence (see the first and second embodiments). The base station preferably uses only (1/N)*NFFT subcarriers, where NFFT represents an FFT window size (see the fifth embodiment). In addition, the base station may use a Frank sequence as the CAZAC sequence.

Step FDM2: The base station generates a signal sequence repeated in the frequency domain. For example, the base station generates the signal sequence by repeating the CAZAC sequence in the frequency domain. The signal sequence includes null values in the time domain corresponding to the number of repetitions (see the sixth embodiment).

Step FDM3: The base station generates a signal sequence repeated in the time domain. The signal sequence includes null values in the frequency domain corresponding to the number of repetitions (see the first embodiment). The base station may multiply the signal sequence with a code sequence (Walsh, CAZAC, etc.), because the use of the waveform simply repeated in the time domain may degrade autocorrelation properties. The S-SCH signal sequence may be multiplexed so that its signals are placed into null portions.

Step FDM4: The base station uses a Frank sequence as the CAZAC sequence and uses a modulation scheme corresponding to the Frank sequence (see the fifth embodiment).

It should be noted that Steps FDM1-FDM4 may be performed in any order and in any combination.

[Method of Generating a P-SCH Signal Sequence in the Case where the P-SCH Signal Sequence and an S-SCH Signal Sequence are Multiplexed in the Code Domain]

The base station preferably generates a P-SCH signal sequence as shown in FIG. 27, when the P-SCH signal sequence and an S-SCH signal sequence are multiplexed in the code domain.

Step CDM1: The base station generates a CAZAC sequence (see the third and fourth embodiments). The base station preferably uses only (1/N)*NFFT subcarriers, where NFFT represents an FFT window size (see the fifth embodiment). In addition, the base station may use a Frank sequence as the CAZAC sequence.

Step CDM2: The base station generates a signal sequence repeated in the frequency domain. For example, the base station generates the signal sequence by repeating the CAZAC sequence in the frequency domain. The signal sequence includes null values in the time domain corresponding to the number of repetitions (see the sixth embodiment).

Step CDM3: The base station uses a Frank sequence as the CAZAC sequence and uses a modulation scheme corresponding to the Frank sequence (see the fifth embodiment).

It should be noted that Steps CDM1-CDM3 may be performed in any order and in any combination.

According to an embodiment of the present invention, the workload in the mobile station can be reduced, while cell search can be quickly performed in the mobile station.

This international patent application is based on Japanese Priority Application No. 2006-127993 filed on May 1, 2006, Japanese Priority Application No. 2006-169452 filed on Jun. 19, 2006, and Japanese Priority Application No. 2006-225922 filed on Aug. 22, 2006, the entire contents of which are incorporated herein by reference.

What is claimed is:

1. A base station, comprising:
a P-SCH basic waveform generating unit configured to generate, as a P-SCH basic waveform, a signal sequence in which codes with constant amplitude in a frequency domain are placed at intervals of a predetermined number of subcarriers;
a frequency-to-time transforming unit configured to transform the signal sequence into a time domain;
a code sequence multiplying unit configured to multiply the signal sequence transformed into the time domain with a predetermined code sequence;
a time-to-frequency transforming unit configured to retransform the signal sequence multiplied with the predetermined code sequence into the frequency domain;
an S-SCH generating unit configured to generate an S-SCH signal sequence; and
a multiplexing unit configured to multiplex the signal sequence retransformed into the frequency domain and the S-SCH signal sequence.

2. The base station as claimed in claim 1, wherein:
the multiplexing unit multiplexes, in the frequency domain, the S-SCH signal sequence into a subcarrier which has low power among the signal sequences retransformed into the frequency domain.

3. The base station as claimed in claim 1, wherein:
the multiplexing unit multiplexes, in the frequency domain, the S-SCH signal sequence into a subcarrier which is not used for a P-SCH by the P-SCH basic waveform generating unit.

4. The base station as claimed in claim 1, wherein:
the P-SCH basic waveform generating unit generates the signal sequence with a bandwidth which is derived by multiplying a synchronization channel bandwidth with the inverse of a spreading factor;
the base station further comprises a spreading unit configured to spread the signal sequence retransformed into the frequency domain with the spreading factor;
the S-SCH generating unit generates the S-SCH signal sequence with the bandwidth which is derived by multiplying the synchronization channel bandwidth with the inverse of the spreading factor and spreads the S-SCH signal sequence with the spreading factor; and
the multiplexing unit multiplexes the spread signal sequence and the spread S-SCH signal sequence in a code domain.

5. The base station as claimed in claim 1, wherein:
the P-SCH basic waveform generating unit generates the signal sequence with a bandwidth which is derived by multiplying a synchronization channel bandwidth with the inverse of a spreading factor;
the S-SCH generating unit generates the S-SCH signal sequence with the bandwidth which is derived by multiplying the synchronization channel bandwidth with the inverse of the spreading factor;
the multiplexing unit multiplexes the P-SCH signal sequence and the S-SCH signal sequence in a code domain; and
the base station further comprises a spreading unit configured to spread the signal sequence retransformed into the frequency domain with the spreading factor.

6. The base station as claimed in claim 1, further comprising:
a filter configured to eliminate out-of-band components when the signal sequence multiplied with the predetermined code sequence is retransformed into the frequency domain.

7. The base station as claimed in claim 1, wherein:
the P-SCH basic waveform generating unit generates the signal sequence using a CAZAC sequence.

8. The base station as claimed in claim 1, wherein:
the code sequence multiplying unit sign-inverts the signal sequence transformed into the time domain.

9. The base station as claimed in claim 1, wherein:
the P-SCH basic waveform generating unit generates the P-SCH basic waveform within a bandwidth of (1/N)*NFFT centered at a center frequency in the frequency domain, where N represents an integer value and NFFT represents an FFT window size.

10. The base station as claimed in claim 1, wherein:
the P-SCH basic waveform generating unit generates the P-SCH basic waveform using a Frank sequence within a bandwidth of (1/N)*NFFT centered at a center frequency in the frequency domain, where N represents an integer value and NFFT represents an FFT window size.

11. The base station as claimed in claim 1, further comprising:
a puncturing unit configured to puncture the signal sequence multiplied with the predetermined code sequence.

12. The base station as claimed in claim 1, further comprising:
a code sequence multiplying unit configured to multiply the signal sequence retransformed into the frequency domain with a predetermined code sequence.

13. A method of generating a P-SCH signal sequence, comprising the steps of:
generating a CAZAC sequence within a bandwidth of (1/N)*NFFT centered at a center frequency in the frequency domain, where N represents an integer value and NFFT represents an FFT window size; and
generating a repetitive sequence which is derived by repeating the CAZAC sequence in the frequency domain.

14. The method as claimed in claim 13, further comprising the step of:
puncturing the repetitive sequence in the frequency domain.

15. The method as claimed in claim 13, wherein:
the CAZAC sequence comprises a Frank sequence corresponding to a predetermined data modulation scheme.

* * * * *